US008787287B2

(12) United States Patent  
Cho et al.

(10) Patent No.: US 8,787,287 B2  
(45) Date of Patent: Jul. 22, 2014

(54) METHOD AND APPARATUS FOR TRANSMITTING/RECEIVING CONTROL INFORMATION FOR ADDITIONAL BROADCAST INFORMATION IN A WIRELESS COMMUNICATION SYSTEM

(75) Inventors: Hee Jeong Cho, Anyang-si (KR); Ki Seon Ryu, Anyang-si (KR); Young Soo Yuk, Anyang-si (KR); Hyun Woo Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 203 days.

(21) Appl. No.: 13/382,520

(22) PCT Filed: Jul. 6, 2010

(86) PCT No.: PCT/KR2010/004398  
§ 371 (c)(1),  
(2), (4) Date: Jan. 5, 2012

(87) PCT Pub. No.: WO2011/005015  
PCT Pub. Date: Jan. 13, 2011

(65) Prior Publication Data  
US 2012/0113940 A1 May 10, 2012

Related U.S. Application Data

(60) Provisional application No. 61/223,071, filed on Jul. 6, 2009, provisional application No. 61/228,980, filed on  
(Continued)

(30) Foreign Application Priority Data

Jul. 6, 2010 (KR) .................. 10-2010-0064783

(51) Int. Cl.  
*H04W 4/00* (2009.01)  
*H04W 48/10* (2009.01)  
*H04W 72/04* (2009.01)  
*H04W 48/12* (2009.01)

(52) U.S. Cl.  
CPC .............. *H04W 4/00* (2013.01); *H04W 48/10* (2013.01); *H04W 48/12* (2013.01); *H04W 72/04* (2013.01)

USPC .......... 370/329; 370/315; 370/328; 370/468; 370/477; 370/478

(58) Field of Classification Search  
CPC ....... H04W 4/00; H04W 48/10; H04W 48/12; H04W 72/04  
USPC .......... 370/203, 208, 315–330, 468, 476–478  
See application file for complete search history.

(56) References Cited

U.S. PATENT DOCUMENTS 5,838,668 A * 11/1998 Okada et al. .................. 370/312  
(Continued)

FOREIGN PATENT DOCUMENTS

KR     1020020033320     5/2002  
(Continued)

OTHER PUBLICATIONS

Australian Intellectual Property Office Application Serial No. 2010269310, Office Action dated May 24, 2013, 4 pages.

(Continued)

*Primary Examiner* — Andrew Chriss  
*Assistant Examiner* — Rasha Fayed  
(74) *Attorney, Agent, or Firm* — Lee, Hong, Degerman, Kang & Waimey

(57) ABSTRACT

The present invention relates to a method and apparatus for transmitting/receiving control information for additional broadcast information in a wireless communication system. According to one aspect of the present invention, a method for transmitting control information for additional broadcast information in a wireless communication system comprises a step in which a base station transmits control information containing information on the transmission time of the additional broadcast message, and transmits the additional broadcast message at said transmission time.

21 Claims, 17 Drawing Sheets

Related U.S. Application Data

Jul. 28, 2009, provisional application No. 61/229,724, filed on Jul. 30, 2009, provisional application No. 61/230,112, filed on Jul. 31, 2009, provisional application No. 61/234,325, filed on Aug. 17, 2009, provisional application No. 61/235,361, filed on Aug. 20, 2009, provisional application No. 61/235,685, filed on Aug. 20, 2009, provisional application No. 61/236,864, filed on Aug. 25, 2009, provisional application No. 61/238,698, filed on Sep. 1, 2009, provisional application No. 61/240,243, filed on Sep. 7, 2009, provisional application No. 61/250,873, filed on Oct. 13, 2009, provisional application No. 61/289,387, filed on Dec. 22, 2009, provisional application No. 61/318,390, filed on Mar. 29, 2010, provisional application No. 61/328,643, filed on Apr. 28, 2010, provisional application No. 61/330,880, filed on May 4, 2010.

(56) References Cited

U.S. PATENT DOCUMENTS

| | | | | |
|---|---|---|---|---|
| 5,930,241 | A * | 7/1999 | Fried | 370/328 |
| 7,103,031 | B2 * | 9/2006 | Lee et al. | 370/345 |
| 7,689,215 | B2 * | 3/2010 | Kwon et al. | 455/434 |
| 8,190,096 | B2 * | 5/2012 | Rutjes et al. | 455/67.11 |
| 8,223,686 | B2 * | 7/2012 | Cho et al. | 370/319 |
| 8,477,690 | B2 * | 7/2013 | Khoryaev et al. | 370/328 |
| 8,619,693 | B2 * | 12/2013 | Noh et al. | 370/329 |
| 2009/0197630 | A1 * | 8/2009 | Ahn et al. | 455/522 |
| 2009/0252075 | A1 * | 10/2009 | Ji et al. | 370/312 |
| 2009/0303953 | A1 * | 12/2009 | Kang et al. | 370/329 |
| 2010/0008282 | A1 * | 1/2010 | Bhattad et al. | 370/312 |
| 2010/0041428 | A1 * | 2/2010 | Chen et al. | 455/522 |
| 2010/0189038 | A1 * | 7/2010 | Chen et al. | 370/328 |
| 2010/0195583 | A1 * | 8/2010 | Nory et al. | 370/329 |
| 2010/0232546 | A1 * | 9/2010 | Yu et al. | 375/300 |
| 2010/0303013 | A1 * | 12/2010 | Khandekar et al. | 370/328 |
| 2011/0096734 | A1 * | 4/2011 | Damnjanovic et al. | 370/329 |
| 2011/0098076 | A1 * | 4/2011 | Kim et al. | 455/522 |
| 2011/0222491 | A1 * | 9/2011 | Vajapeyam et al. | 370/329 |
| 2012/0113947 | A1 * | 5/2012 | Kim et al. | 370/329 |

FOREIGN PATENT DOCUMENTS

| | | |
|---|---|---|
| KR | 1020070027070 | 3/2007 |
| WO | 2006/019266 | 2/2006 |
| WO | 2008/078245 | 7/2008 |
| WO | 2009/051455 | 4/2009 |

OTHER PUBLICATIONS

Canadian Intellectual Property Office Application Serial No. 2,767,214, Office Action dated Jul. 10, 2013, 2 pages.

\* cited by examiner

FIG. 2

$N_{subframe,A-MAP} = 2$

| A-MAP DL SF0 | DL SF1 | DL SF2 | DL SF3 | DL SF4 | DL SF5 | DL SF6 | DL SF7 |

(a)

$N_{subframe,A-MAP} = 2$

| A-MAP DL SF0 | A-MAP DL SF1 | A-MAP DL SF2 | A-MAP DL SF3 | UL SF4 | UL SF5 | UL SF6 | UL SF7 |

| BIT 1 for SCD | BIT 2 for NBR-ADV | BIT 3 for SII-ADV | ...... | BIT 13 for LBS-ADV |

METHOD AND APPARATUS FOR TRANSMITTING/RECEIVING CONTROL INFORMATION FOR ADDITIONAL BROADCAST INFORMATION IN A WIRELESS COMMUNICATION SYSTEM

CROSS-REFERENCE TO RELATED APPLICATIONS

This application is the National Stage filing under 35 U.S.C. 371 of International Application No. PCT/KR2010/004398, filed on Jul. 6, 2010, which claims the benefit of earlier filing date and right of priority to Korean Application No. 10-2010-0064783, filed on Jul. 6, 2010, and also claims the benefit of U.S. Provisional Application Ser. No. 61/330,880, filed on May 4, 2010, 61/328,643, filed on Apr. 28, 2010, 61/318,390, filed on Mar. 29, 2010, 61/289,387, filed on Dec. 22, 2009, 61/250,873, filed on Oct. 13, 2009, 61/240,243, filed on Sep. 7, 2009, 61/238,698, filed on Sep. 1, 2009, 61/236,864, filed on Aug. 25, 2009, 61/235,685, filed on Aug. 20, 2009, 61/235,361, filed on Aug. 20, 2009, 61/234,325, filed on Aug. 17, 2009, 61/230,112, filed on Jul. 31, 2009, 61/229,724, filed on Jul. 30, 2009, 61/228,980, filed on Jul. 28, 2009, and 61/223,071, filed on Jul. 6, 2009, the contents of which are all incorporated by reference herein in their entirety.

FIELD OF THE INVENTION

The present invention relates to a wireless communication system, and more particularly to a method and apparatus for transmitting and receiving control information of additional broadcast information in a wireless communication system.

BACKGROUND ART

Additional broadcast information includes control information that informs an idle-mode UE or a sleep-mode UE of not only extended system parameter and configuration information but also the presence or absence of a downlink signal, and is then transmitted through a traffic channel.

The extended system parameter and configuration information is not necessary for a UE accessing the network, but it has system configuration parameter and information needed for the UE that has accessed the network.

A variety of the extended system parameter and configuration information may be used, for example, handover-associated information, multiple input multiple output (MIMO)-associated information, relay-associated information, multicarrier-associated information, femtocell-associated information, enhanced multicast broadcast service (EMBS) information, inter radio access technology (inter-RAT)—associated information, neighbor-cell-associated information, etc.

A variety of broadcast messages may be used, for example, system configuration descriptor message (SCD) message, a neighbor advertisement (NBR-ADV) message, a traffic indication (hereinafter referred to as 'TRF-IND') message, a BS broadcast paging (hereinafter referred to as 'PAG-ADV') message, a paging ID information (PGID) message, an SS network clock comparison (hereinafter referred to as 'CLK-CMP') message, a service identity broadcast (hereinafter referred to as 'SII-ADV') message, a location information broadcast for LBS (hereinafter referred to as "LBS-ADV") message, etc.

The SCD message includes handover information, MIMO information, EMBS information and inter-RAT information.

The NBR-ADV message includes information about neighbor BSs.

The TRF-IND message is transmitted to a UE during the listening time of the sleep-mode UE, and indicates the presence or absence of a signal to be transmitted to the UE.

FIG. 1 shows a superframe structure. As shown in FIG. 1, one superframe includes 4 frames, and one frame includes 8 subframes. If the ratio of a downlink to an uplink is 5:3, one frame includes 5 downlink subframes and 3 uplink subframes.

The foremost downlink subframe of the superframe includes a superframe header (SFH).

The SFH includes a system parameter and system configuration information. The SFH is divided into a primary SFH (P-SFH) and a secondary SFH (S-SFH).

The P-SFH is transmitted in all superframes. The S-SFH is transmitted once at intervals of one or more superframes. Information transmitted over the S-SFH is divided into a plurality of subpackets.

Advanced MAP (A-MAP) transmits unicast service control information. The unicast service control information includes UE-specific control information and non-user-specific control information. The UE-specific control information is divided into assignment information, HARQ feedback information, and power control information, each of which is transmitted through assignment A-MAP, HARQ feedback A-MAP (HARQ feedback A-MAP), power control A-MAP, etc.

All A-MAPs share physical resources called the A-MAP region.

FIG. 2 shows the A-MAP region. Referring to FIG. 2, the A-MAP region is present per $N_{subframe,A-MAP}$ subframe of the frame.

FIG. 2(a) shows the case in which $N_{subframe,A-MAP}$ is set to 2. Referring to FIG. 2(a), if $N_{subframe,A-MAP}$ is set to 2, the A-MAP region is present per two subframes. If $N_{subframe,A-MAP}$ is set to 1, the A-MAP region is present per subframe.

The UE has to decode a broadcast message to obtain the latest additional broadcast information every time. Continuously recognizing the presence or absence of a message until the idle-mode UEs or the sleep-mode UEs receive broadcast messages is far from efficient. In addition, if the UE is switched from the idle mode or the sleep mode to the active mode, there occurs an unexpected transfer delay until receiving a broadcast message.

DETAILED DESCRIPTION OF THE INVENTION

Technical Problem

As described above, the related art is far from efficient in terms of power saving and unavoidably causes a transfer delay.

An object of the present invention is to provide a method for transmitting additional broadcast information that is capable of reducing power consumption and causing a transmission delay.

It is to be understood that technical objects to be achieved by the present invention are not limited to the aforementioned technical objects and other technical objects which are not mentioned herein will be apparent from the following description to one of ordinary skill in the art to which the present invention pertains.

Technical Solution

The object of the present invention can be achieved by providing a method for transmitting control information for an additional broadcast message by a base station of a wireless communication system including: transmitting control information including information of a transmission time point of the additional broadcast message; and transmitting the additional broadcast message at the transmission time point.

In another aspect of the present invention, a method for receiving control information for an additional broadcast message by a user equipment of a wireless communication system includes receiving control information including information of a transmission time point of the additional broadcast message from a base station; and receiving the additional broadcast message at the transmission time point.

The control information may further include a configuration change count indicating version information of the additional broadcast message.

The control information may be transmitted through a secondary superframe header (S-SFH), an advanced-MAP (A-MAP), or a MAC management message.

A base station includes a processor for transmitting control information including information of a transmission time point of the additional broadcast message, and a transmission module for transmitting the control information, and transmitting the additional broadcast message at the transmission time point.

A user equipment includes a reception module for receiving control information, that includes not only information of a transmission time point of the additional broadcast message but also a configuration change count indicating version information of the additional broadcast message, from a base station, and receiving the additional broadcast message at the transmission time point, and a processor for updating the received additional broadcast message when the configuration change count is different from a configuration change count stored in the user equipment.

Effects of the Invention

As is apparent from the above description, embodiments of the present invention have the following effects. A base station (BS) transmits control information regarding additional broadcast information, such that a user equipment (UE) can reduce power consumption and prevent a transfer delay through selective decoding and efficient updating.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

BRIEF DESCRIPTION OF THE DRAWINGS

The accompanying drawings, which are included to provide a further understanding of the invention, illustrate embodiments of the invention and together with the description serve to explain the principle of the invention.

FIG. 2 shows an A-MAP region.

FIG. 3 shows an exemplary case in which an SCD message and an NBR-ADV message are transmitted when a transmission period of the SCD message and the NBR-ADV message is two times an S-SFH SP3 period.

FIG. 16 shows that the list of additional broadcast messages is represented in the form of bitmap.

BEST MODE FOR CARRYING OUT THE INVENTION

Figure 1:
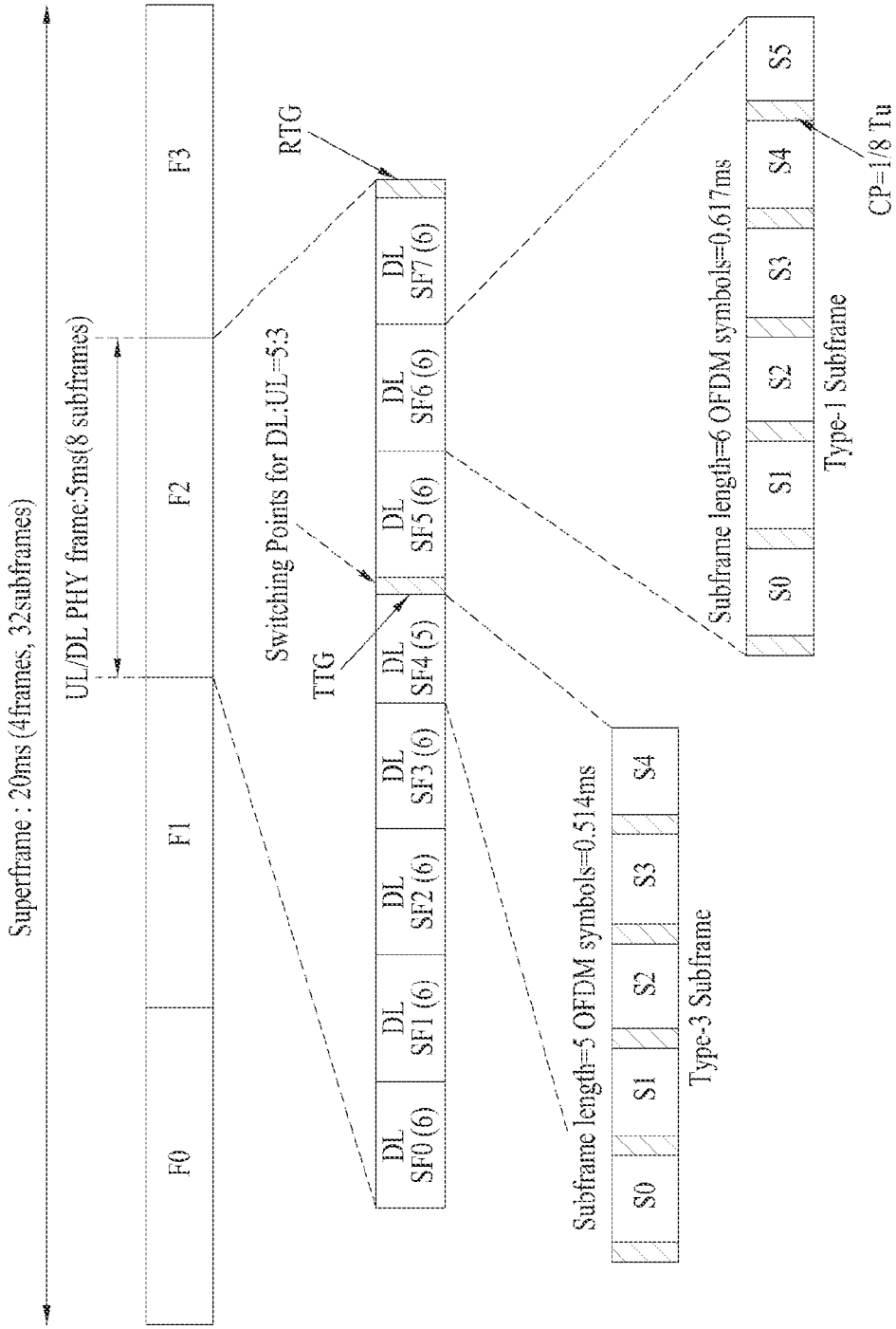
FIG. 1 shows a superframe structure.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details. For example, the following description will be given centering upon a mobile communication system serving as a 3GPP 802.16 system, but the present invention is not limited thereto and the remaining parts of the present invention other than unique characteristics of the 3GPP 802.16 system are applicable to other mobile communication systems.

In some cases, in order to prevent ambiguity of the concepts of the present invention, conventional devices or apparatuses well known to those skilled in the art will be omitted and be denoted in the form of a block diagram on the basis of important functions of the present invention. Wherever possible, the same reference numbers will be used throughout the drawings to refer to the same or like parts.

In the following description, a terminal may refer to a mobile or fixed user equipment (UE), for example, a user equipment (UE), a mobile station (MS) and the like. Also, a base station (BS) may refer to an arbitrary node of a network end which communicates with the above terminal, and may include a Node B, an eNode B, a base station (BS) and the like.

An embodiment of the present invention provides a method for enabling a base station (BS) to transmit control information of a broadcast message so as to enable a UE to selectively decode a broadcast message.

A first embodiment of the present invention provides a method for transmitting control information of a broadcast message through an S-SFH. A second embodiment of the present invention provides a method for transmitting control information of a broadcast message through an A-MAP. A third embodiment of the present invention provides a method for transmitting control information of a broadcast message through an MAC management message.

First, a method for transmitting control information of an additional broadcast message according to a first embodiment of the present invention will hereinafter be described in detail.

The BS transmits control information of a broadcast message to UEs. According to a first embodiment of the present invention, the BS transmits control information of a broadcast message to UEs through S-SFH.

Control information of a broadcast message transmitted from the BS to the UE includes additional broadcast information (ABI) scheduling information, ABI scheduling period information, an ABI start position, a transmission period and offset, an ABI configuration change count, an applied configuration change count for SCD message (hereinafter referred to as "SCD count"), etc.

The ABI scheduling information indicates transmission or non-transmission of an additional broadcast message. If the additional broadcast message is transmitted, the ABI scheduling information indicates which one of ABI types is transmitted.

For example, the ABI type can be defined by the following Table 1.

TABLE 1

| Type | ABI |
| --- | --- |
| Type 1 | Information for neighbor advertisement (characteristics of neighbor BS) |
| Type 2 | Information for inter-RAT (MIH capability support) |
| Type 3 | Information for EMBS (Service ID, resource allocation information for EMBS) |
| Type 4 | Information for MIMO |
| Type 5 | Information for Relay |
| Type 6 | Information for Multi-Carrier |
| Type 7 | The rest of information (AAI_SCD) |

For example, if ABI scheduling information is set to 0b000, this indicates non-transmission of an additional broadcast message. If ABI scheduling information is set to 0b001, this indicates a system configuration descriptor (SCD) message.

If ABI scheduling information is set to 0b010, this indicates transmission of a neighbor advertisement (NBR-ADV) message. If ABI scheduling information is set to 0b011, this indicates transmission of a BS broadcast paging (PAG-ADV) message.

Alternatively, information indicating transmission or non-transmission of some types from among ABI types can be explicitly designated. For example, if ABI scheduling information is set to 0b00, this indicates non-transmission of an additional broadcast message. If ABI scheduling information is set to 0b01, this indicates transmission of an SCD message. If ABI scheduling information is set to 0b11, this indicates transmission of the remaining broadcast messages other than the SCD message and the NBR-ADV message.

If transmission of an additional broadcast message is defined whenever an S-SFH SP is transmitted, an indicator indicating non-transmission of the additional broadcast message may not be necessary.

The BS may transmit information regarding a transmission time point of an additional broadcast message to the UE. As a result, there is a need for the idle-mode UE or the sleep-mode UE to be woken up only at a specific time at which an additional broadcast message is transmitted, resulting in reduction of power consumption. Information regarding a transmission time point of the additional broadcast message may include ABI scheduling period information, ABI start position, ABI transmission interval, and a transmission offset.

ABI scheduling period information will hereinafter be described with reference to FIG. 3.

A transmission period of additional broadcast messages may be represented by an N multiple of a specific S-SFH subpacket (SP) transmission period.

For example, provided that a period (160 ms) of the S-SFH SP3 is used as a reference, the transmission period of the SCD message is represented by '160x-ms'.

Figure 3:
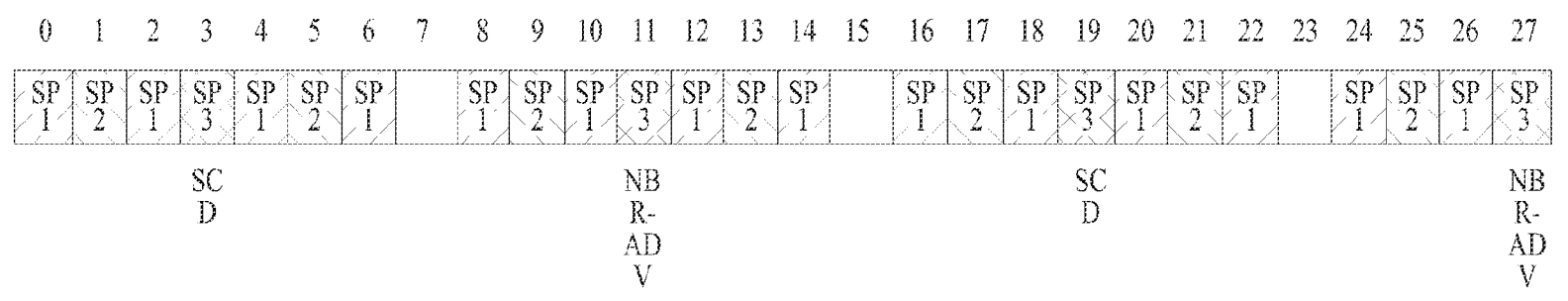

FIG. 3 shows an exemplary case in which an SCD message and an NBR-ADV message are transmitted when a transmission period of the SCD message and the NBR-ADV message is two times an S-SFH SP3 period.

FIG. 3 shows 28 superframes. SP1 indicates that S-SFH SP is transmitted to the corresponding superframe. SP2 indicates that S-SFH SP2 is transmitted to the corresponding superframe. SP3 indicates that S-SFH SP3 is transmitted to the corresponding superframe. Referring to FIG. 3, S-SFH SP3 is transmitted per 8 superframes, and the SCD message and the NBR-ADV message are transmitted per 16 superframes.

The ABI start position indicates an offset between a superframe in which S-SFH SP including ABI start position information is transmitted and another superframe in which ABI to be initially transmitted in the corresponding S-SFH SP period.

For example, if the ABI start position is set to 0, this indicates that ABI is transmitted in the same superframe as that of the corresponding S-SFH SP. If the ABI start position is set to 1, this indicates that ABI is transmitted in the next superframe after transmission of the corresponding S-SFH SP. If the ABI start position is composed of 4 bits and is set to 0b1111, this may indicate non-transmission of ABI within the corresponding SP period.

In addition, the ABI start position may include not only a superframe position but also frame position information.

The ABI transmission interval and the transmission offset will hereinafter be described in detail with reference to FIG. 4.

Figure 4:
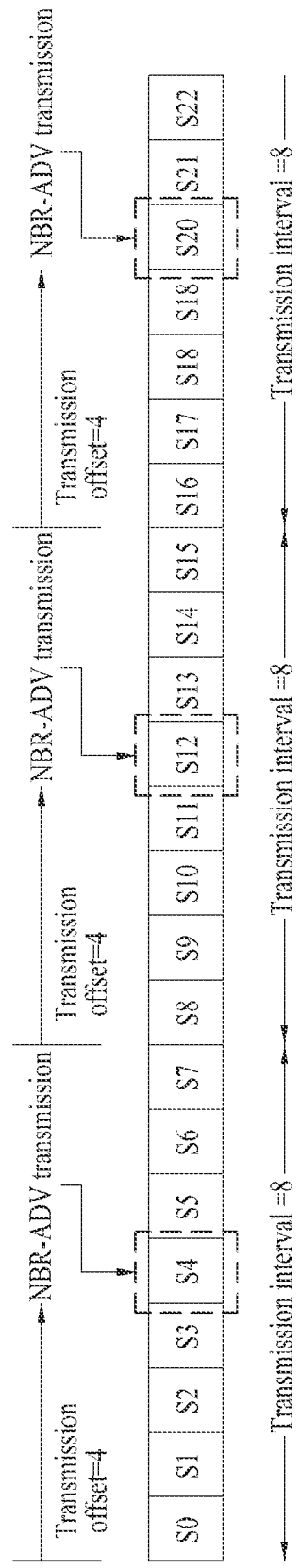
FIG. 4 shows a method for indicating a transmission time point of an additional broadcast message using an ABI transmission interval and a transmission offset.

Referring to FIG. 4, 'p' is a factor for calculating the ABI transmission interval in which an additional broadcast message can be transmitted. The transmission offset indicates a difference between a first superframe and another superframe in which an additional broadcast message is transmitted within a transmission interval. If the transmission offset is fixed to a specific value, a transmission offset field may be omitted.

FIG. 4 shows a method for indicating a transmission time point of an additional broadcast message using an ABI transmission interval and a transmission offset.

In FIG. 4, provided that a transmission interval of the additional broadcast message is denoted by $2^p$ and p is set to 3, the additional broadcast message is transmitted at intervals of 8 superframes. That is, superframes, each of which includes a superframe number (modulo $2^p$) of 0~7, is used as one transmission interval.

If the transmission offset is set to 4, the NBR-DV message is transmitted at the $4^{th}$, $12^{th}$, and $20^{th}$ superframes.

'p' may also be defined in the same manner as in Tables 2, 3, and 4. As shown in Tables 2 to 4, 'p' may be defined in various formats. That is, the start value of 'p' and the range thereof can be defined in various ways.

TABLE 2

| transmission interval field | p |
|---|---|
| 0000 | 0 |
| 0001 | 1 |
| 0010 | 2 |
| 0011 | 3 |
| 0100 | 4 |
| ... | ... |
| 1111 | 15 |

TABLE 3

| transmission interval field | p |
|---|---|
| 0000 | 4 |
| 0001 | 5 |
| 0010 | 6 |
| 0011 | 7 |
| 0100 | 8 |
| ... | ... |
| 1111 | 11 |

TABLE 4

| transmission interval field | p |
|---|---|
| 0000 | 5 |
| 0001 | 6 |
| 0010 | 7 |
| 0011 | 8 |
| 0100 | 9 |
| ... | ... |
| 1111 | 12 |

Alternatively, the ABI transmission interval may also be defined as shown in Table 5.

TABLE 5

| transmission interval field | transmission interval |
|---|---|
| 0b00 | $y = 0; N \times 2^{\alpha y + \beta}$ superframes |
| 0b01 | $y = 1; N \times 2^{\alpha y + \beta}$ superframes |
| 0b10 | $y = 2; N \times 2^{\alpha y + \beta}$ superframes |
| 0b11 | $y = 3; N \times 2^{\alpha y + \beta}$ superframes |

In this case, N, α, or β may be predefined, and may be signaled by a BS.

Figure 5:
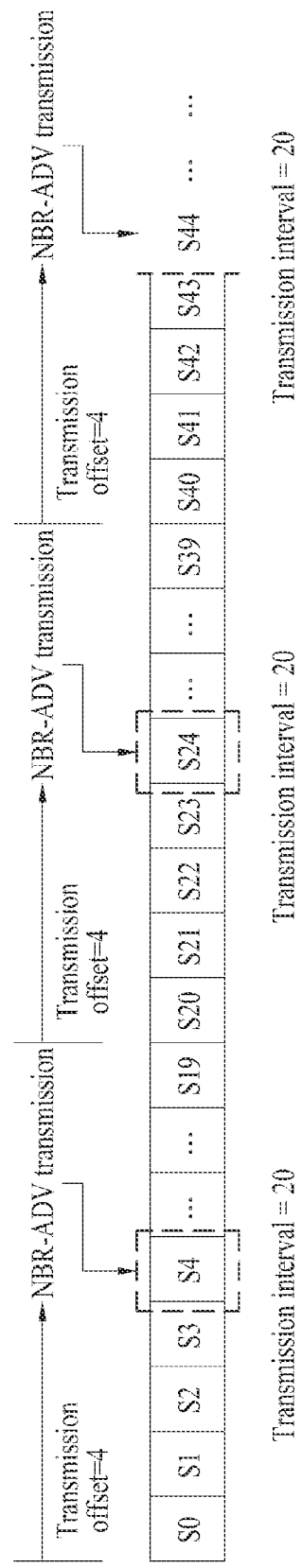
FIG. 5 shows an exemplary case in which an NBR-ADV message is transmitted under the condition that N is set to 10, α is set to 1, and β is set to 1 and a transmission interval field is signaled as '0b00'.

FIG. 5 shows an exemplary case in which an NBR-ADV message is transmitted under the condition that N is set to 10, α is set to 1, and β is set to 1 and a transmission interval field is signaled as '0b00'.

Referring to FIG. 5, since N is set to 10, α is set to 1, β is set to 1, and y is set to 0, a transmission interval of the NBR-ADV message is set to 20 superframes. If a transmission offset is set to 4, the NBR-ADV message is transmitted at the $4^{th}$, $24^{th}$, and $44^{th}$ superframe as shown in FIG. 5.

The ABI transmission interval or the transmission offset may be predefined as a specific value. In this case, the BS need not transmit the ABI transmission interval and the transmission offset to the UE.

BSs contained in the same group may have the same ABI transmission interval and the same transmission offset. For example, BSs belonging to the same paging group may have the same ABI transmission interval and the same transmission offset. If the UE moves to either another BS or a BS belonging to the same group as that of the previous BS, the UE can receive an additional broadcast message using the ABI transmission interval and the transmission offset that have been used by the previous BS, without receiving the ABI transmission interval and the transmission offset from the BS.

If the size of a transmission offset is set to 3 bits, the range of a transmission offset is set to 0~7. In this case, the UE monitors the range from the start point of the transmission interval to the seven offset. If the additional broadcast message is detected at the fourth offset (i.e., 4-offset), the UE may implicitly recognize a transmission offset of 4.

The ABI configuration change count will hereinafter be described in detail.

System information contained in the SCD message and the NBR-ADV message can be changed, such that the UE has to recognize version information of the SCD message and the NBR-ADV message. The ABI configuration change count of the SCD message indicates version information of the SCD message, and the ABI configuration change count of the NBR-ADV message indicates version information of the NBR-ADV message.

The ABI configuration change count of the SCD message is increased by one whenever system information contained in the SCD message is changed. The ABI configuration change count of the NBR-ADV message is increased by one whenever system information contained in the NBR-ADV message is changed.

The UE updates the corresponding message only when the ABI configuration change count value received from the BS is different from that of the UE.

The ABI configuration change count field can be established in two formats.

The first format indicates version information of the additional broadcast message transmitted in response to the value of the ABI scheduling information field.

That is, if the ABI scheduling information field indicates transmission of the SCD message, the ABI configuration change count field indicates version information of the SCD message. The UE compares the value of an ABI configuration change count of its own SCD message with the value of the received ABI configuration change count field. If the two ABI configuration change count fields have different values, the SCD message is decoded and system information is updated.

If the ABI scheduling information field indicates transmission of the NBR-ADV message, the ABI configuration change count field indicates version information of the NBR-ADV message.

The UE compares the value of an ABI configuration change count field of its own NBR-ADV message with the value of the received ABI configuration change count field. If the two ABI configuration change count field values are different from each other, the NBR-ADV message is decoded and system information is updated.

The second format indicates version information of all additional broadcast messages in which the ABI configuration change count field has a count value, irrespective of the ABI scheduling information field. In other words, the ABI configuration change count field includes version information of each of the SCD message and the NBR-ADV message.

The SCD count will hereinafter be described in detail.

The SCD count indicates version information of the SCD message that is currently applied to or to be applied to the system.

Table 6 shows some parts of the S-SFH format, and Table 7 shows some parts of the AAI_SCD message format.

TABLE 6

| Syntax | Size (bit) | Notes |
|---|---|---|
| SCD Count | 4 | Indicates Configuration Change Count which is considered for applying the system configuration of the AAI_SCD. |

TABLE 7

| Attributes/Array of attributes | Size (bits) | Value/Note |
|---|---|---|
| Configuration Change Count | 4 | The value is increased whenever the contents of this message is changed The value rolls over from 0 to 15 |
| SCD applying offset | 6 | Indicate superframe offset between the current superframe where the AAI_SCD message with Change Configuration Count is sent and superframe where system configuration in association with the Change Configuration Count is used. The value shall be decided by superframe where the S-SFH SP 3 is applied after sending S-SFH SP 3 with the SCD count equal to the Change Configuration Count. |

In case of system information transmitted through S-SFH, the S-SFH change cycle may be limited by the "Rate of change of S-SFH info" field contained in the S-SFH SP3, such that application of the changed SCD system information is interoperable with the S-SFH application time point.

That is, after the SCD count having the same value as that of the configuration change count of the current AAI_SCD is transmitted through the S-SFH, the BS applies the changed system information contained in the SCD message of the corresponding SCD count at the application time point of the corresponding S-SFH.

The UE recognizes the S-SFH change through a P-SFH, and receives the changed S-SFH. In addition, assuming that the SCD count of the S-SFH is different from the latest SCD count stored in the UE and the S-SFH is not yet applied, the UE applies system information of the SCD message of the previous SCD count until application of the S-SFH.

In addition, the UE applies system information contained in the SCD message of the current SCD count.

Figure 6:
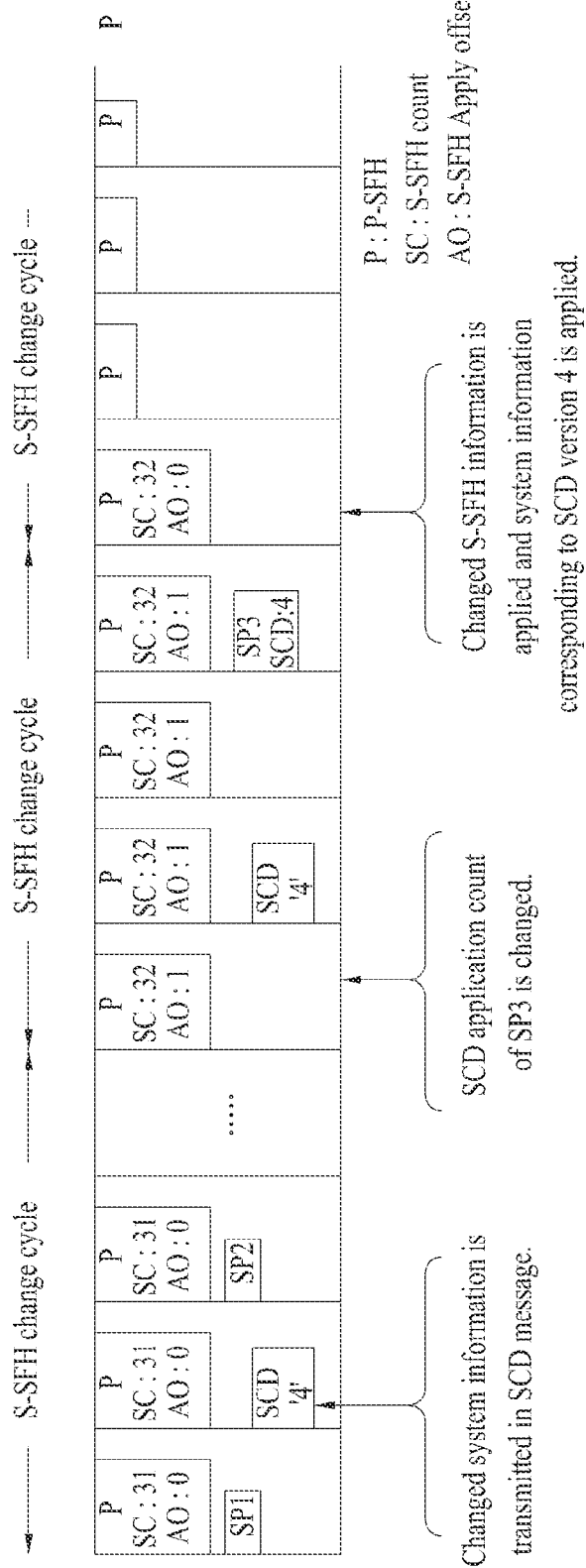
FIG. 6 is a conceptual diagram illustrating an SCD count transmission process.

FIG. 6 is a conceptual diagram illustrating an SCD count transmission process.

Referring to FIG. 6, the current S-SFH count is set to 31, and the SCD count is set to 3.

In FIG. 6, the BS transmits the SCD message at the second superframe. The SCD message includes system information and the configuration change count. The SCD message transmitted in the same superframe includes changed system information, and the configuration change count field is set to 4. That is, since system information of the SCD message is changed, the configuration change count is changed from 3 to 4.

The BS transmits the SCD count indicating a version of the SCD message to be applied through the S-SFH SP 3. That is, in order to transmit system information contained in the SCD message transmitted at the second superframe, the BS changes the SCD count of 3 to another SCD count of 4, such that it transmits data to the UE through the S-SFH SP3. Therefore, since the S-SFH SP3 content is changed, the BS increases the S-SFH count of the P-SFH from 31 to 32. In addition, AO (S-SFH Apply Offset) indicating application time information is set to 1 before application of the S-SFH SP3, and is then transmitted.

During a time period in which AO is set to 1, the UE applies uses system information of an SFH having a version of 31 and system information of an SCD having a version of 3. Thereafter, if AO is changed to 0, system information of an SFH having a version of 32 and system information of an SCD message having a version of 4 are simultaneously applied.

A method for transmitting control information of an additional broadcast message according to a second embodiment of the present invention will hereinafter be described in detail. The second embodiment of the present invention provides a method for transmitting control information of an additional broadcast message through an A-MAP.

Control information of the additional broadcast message transmitted over the A-MAP includes the number of additional broadcast messages transmitted, ABI type bitmap, ABI scheduling periodicity information, ABI transmission interval and transmission offset, ABI length, ABI allocation size, start/end offset for resource allocation, and ABI configuration change count and SCD count.

The ABI allocation size indicates the number of either logical resource units (LRUs) or physical resource units (PRUs) allocated for transmitting the additional broadcast message.

The start/end offset for resource allocation indicates the first/last LRU or PRU index of the resource region in which the corresponding additional broadcast message is transmitted.

The ABI configuration change count may be transmitted along with other control information at a transmission time point of the additional broadcast message, or may be transmitted alone irrespective of the transmission time point of the additional broadcast message.

The SCD count indicates version information of the SCD message applied to the current system. The SCD count may be transmitted along with other control information at a transmission time point of the additional broadcast message in the same manner as in the ABI configuration change count, or may be transmitted alone irrespective of the transmission time point of the additional broadcast message.

The ABI configuration change count and the SCD count may be aperiodically or periodically transmitted. In addition, the ABI configuration change count and the SCD count may also be transmitted simultaneously with PGID, AAI_PAG-ADV, and sleep- or paging-associated broadcast message.

The ABI configuration change count and the SCD count may be transmitted through the non-UE-specific A-MAP region, or may also be transmitted through a UE-specific A-MAP region.

The case in which data is transmitted through a non-UE-specific A-MAP region will hereinafter be described in detail. The BS sets an extension flag of the non-UE-specific A-MAP region to '1', and includes configuration information change counts of the NBR-ADV message and the SCD message in the extended non-UE-specific A-MAP.

The size of non-UE-specific A-MAP region is limited. Thus, if not only the ABI configuration change count and SCD count but also all control information of the addition broadcast message is transmitted through a non-UE-specific A-MAP region, it may be difficult for all the control information of the additional broadcast message to be simultaneously contained in a specific A-MAP region. Therefore, scheduling and transmission region information of the additional broadcast message may not be transmitted simultaneously with the ABI configuration change count and SCD count.

In this case, the UE has to recognize, which control information is transmitted to a specific time, such that the BS has to inform the UE of the recognized information. That is, the BS may include an indicator field explicitly indicating the presence or absence of control information, and may fix or signal the transmission position of the ABI configuration change count that is transmitted alone.

If the ABI configuration change count and the SCD count are transmitted through the UE-specific A-MAP region, the BS transmits the ABI configuration change count and the SCD count using a broadcast ID.

The BS may transmit all the control information of the additional broadcast message within one A-MAP region, or may classify a transmission region of control information of the additional broadcast message.

Table 8 shows the A-MAP format used when all the control information of the additional broadcast message is transmitted in one A-MAP region.

The BS can classify the transmission region of additional broadcast messages.

The first method can predetermine the additional broadcast message to be transmitted in one A-MAP region, irrespective of a total number of A-MAP regions contained in one frame.

The second method can determine control information of the additional broadcast message to be transmitted in one A-MAP region in response to a total number of A-MAP regions contained in one frame.

That is, the number ($N_{broadcast\ message, A-MAP}$) of additional broadcast messages to be used for transmitting control information in one A-MAP region is obtained when a total number of additional broadcast messages is divided by a total number of the A-MAP regions of one frame.

For example, provided that 8 additional broadcast messages exist and the number of A-MAP regions contained in one frame is set to 2, $N_{broadcast\ message, A-MAP}$ is set to 4. That is, control information of a maximum of four additional broadcast messages can be transmitted to each A-MAP region.

For example, control information regarding the SCD message, the NBR-ADV message, the TRG-IND message, and the PAG-ADV message is transmitted through a first A-MAP region. In addition, control information regarding the PGID information message, the CLK-CMP message, the SII-ADV message, and the LBS-ADV message can be transmitted through the second A-MAP region.

Table 9 shows the A-MAP format transmitted through the first A-MAP region.

The BS sequentially transmits the additional broadcast message having a bit value of 1 at the corresponding position of the type bitmap, in the order of type bitmaps from the end point of the first A-MAP region.

TABLE 8

| Syntax | Size | Notes |
|---|---|---|
| Type bitmap | 8 | If $1^{st}$ bit == 1, SCD message is transmitted in this A-MAP region. If $2^{nd}$ bit == 1, NBR-ADV message is transmitted in this A-MAP region. If $3^{rd}$ bit == 1, TRF-IND message is transmitted in this A-MAP region. If $4^{th}$ bit == 1, PAG-ADV message is transmitted in this A-MAP region. If $5^{th}$ bit == 1, PGID message is transmitted in this A-MAP region. If $6^{th}$ bit == 1, CLK-CMP message is transmitted in this A-MAP region. If $7^{th}$ bit == 1, SII-ADV message is transmitted in this A-MAP region. If $8^{th}$ bit == 1, LBS-ADV message is transmitted in this A-MAP region. |
| Applied Configuration Change Count | 4 | Version information of SCD currently applied to system |
| For (i=0; i<8; i++) { If (Type bitmap[i] == 1){ Length (, End offset for resource allocation or allocation size) | TBD | |
| If (i==0 || i==1) { Configuration Change Count | 4 or 8 | If ABS transmits SCD message or NBR-ADV message, this field is included. UE can determine whether to decode the corresponding message by referring to this field |
| }}} | | |

TABLE 9

| Syntax | Size | Notes |
|---|---|---|
| Type bitmap | 4 | If $1^{st}$ bit == 1, SCD message is transmitted in this A-MAP region. If $2^{nd}$ bit == 1, NBR-ADV message is transmitted in this A-MAP region. If $3^{rd}$ bit == 1, TRF-IND message is transmitted in this A-MAP region. If $4^{th}$ bit == 1, PAG-ADV message is transmitted in this A-MAP region. |
| Applied Configuration Change Count | 4 | Version information of SCD currently applied to system |
| For (i=0; i<8; i++) { If (Type bitmap[i] == 1){ Length (, End offset for resource allocation or allocation size) | TBD | |
| If (i==0 || i==1) { Configuration Change Count | 4 or 8 | If ABS transmits SCD message or NBR-ADV message, this field is included. UE can determine whether to decode the corresponding message by referring to this field |
| }}} | | |

Table 10 shows the A-MAP format transmitted in the second A-MAP region.

The BS sequentially transmits the additional broadcast message having a bit value of 1 at the corresponding position of the type bitmap, in the order of type bitmaps from the end point of the second A-MAP region.

TABLE 10

| Syntax | Size | Notes |
| --- | --- | --- |
| Type bitmap | 4 | If 1st bit == 1, PGID message is transmitted in this A-MAP region. If 2nd bit == 1, CLK-CMP message is transmitted in this A-MAP region. If 3rd bit ==1, SII-ADV message is transmitted in this A-MAP region. If 4th bit ==1, LBS-ADV message is transmitted in this A-MAP region. |
| For (i=0; i< 4; i++) { If (Type bitmap[i] == 1) { Length (, End offset for resource allocation or allocation size) }} | TBD | |

Figure 7:
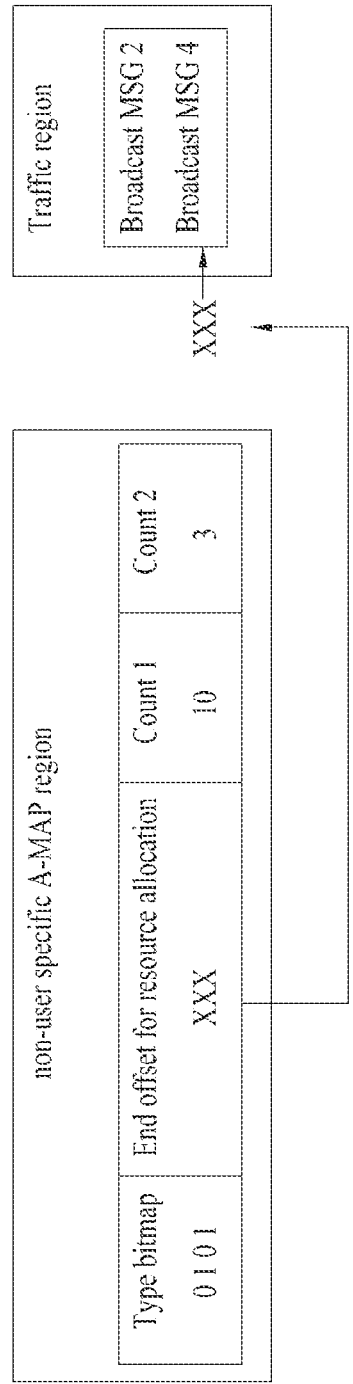
FIG. 7 shows an exemplary case in which additional broadcast messages are joint-coded.

If additional broadcast messages transmitted in the subframe corresponding to the A-MAP region are joint-coded, it is not necessary to include independent information of each additional broadcast message. FIG. 7 shows an exemplary case in which additional broadcast messages are joint-coded. Referring to FIG. 7, if the additional broadcast messages 2 and 4 are joint-coded, the end offset of resource allocation indicates the index of the end resource unit of the resource region to which the additional broadcast messages 2 and 4 are allocated.

A method for transmitting control information of the additional broadcast message through the non-UE-specific A-MAP region according to the embodiments of the present invention will hereinafter be described in detail.

Figure 8:
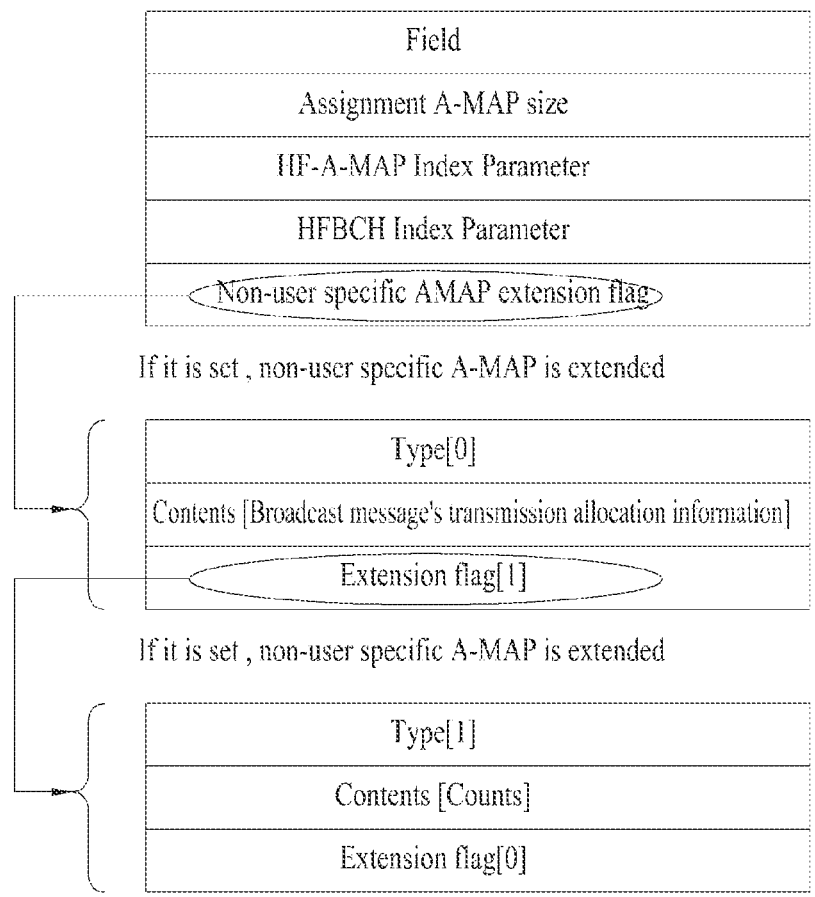
FIG. 8 is a conceptual diagram illustrating a first method for transmitting control information regarding an additional broadcast message through a non-UE-specific A-MAP region.

FIG. 8 is a conceptual diagram illustrating a first method for transmitting control information regarding an additional broadcast message through a non-UE-specific A-MAP region.

Referring to FIG. 8, the type field indicating which information is contained in the extended non-UE-specific A-MAP region is added to the non-UE-specific A-MAP. The type field '0b0' indicates that information associated with additional broadcast message allocation is contained in the extended non-UE-specific A-MAP region. The type field '0b1' indicates a status including the ABI configuration change count and the SCD count.

The extension flag field indicates whether the non-UE-specific A-MAP region is extended and other type information is additionally transmitted.

Figure 9:
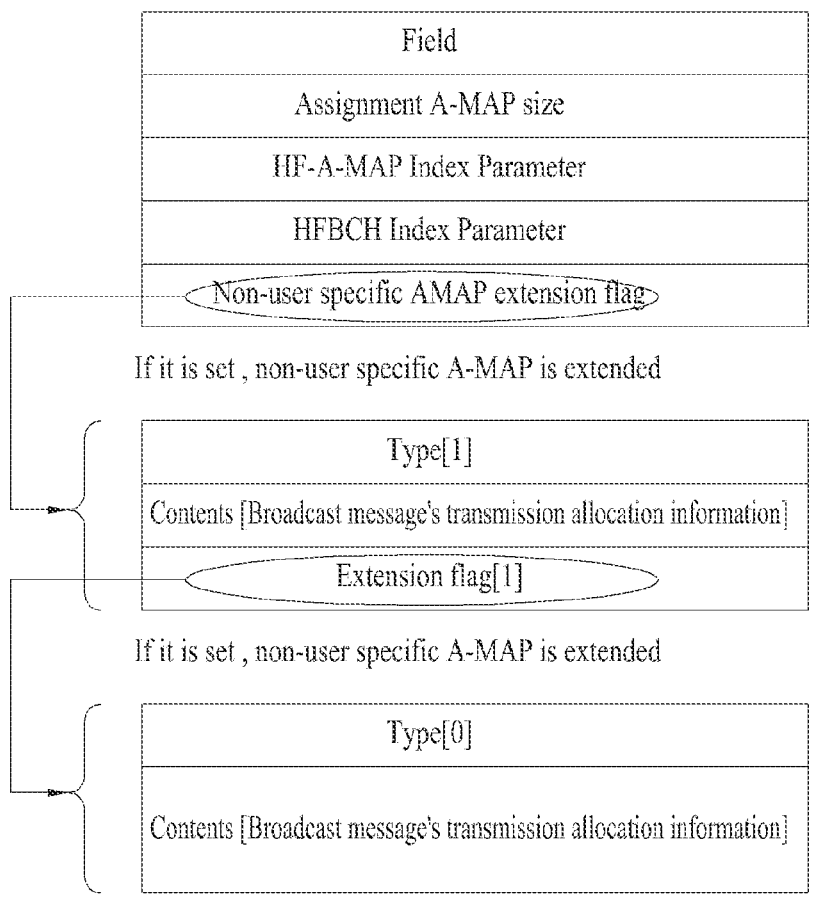
FIG. 9 is a conceptual diagram illustrating a second method for transmitting control information regarding an additional broadcast message through a non-UE-specific A-MAP region.

FIG. 9 is a conceptual diagram illustrating a second method for transmitting control information regarding an additional broadcast message through a non-UE-specific A-MAP region.

Referring to FIG. 9, according to the second method, the extended non-UE-specific A-MAP region including information associated with additional broadcast message allocation does not include the extended flag field. Therefore, when simultaneously transmitting an A-MAP including information associated with additional broadcast message allocation and an A-MAP including count information, the A-MAP including count information must be located before the A-MAP including information associated with additional broadcast message allocation. The count information indicates the ABI configuration change count and the SCD count.

A third method for transmitting control information of the additional broadcast message through the non-UE-specific A-MAP region according to embodiments of the present invention will hereinafter be described in detail.

The BS can transmit transmission configuration information, for example, a transmission position, a transmission time point, and a transmission period of the count information. For example, the BS can transmit ABI count scheduling period information through the S-SFH.

In this case, the ABI count scheduling period information may be associated with a superframe number. For example, if the ABI count scheduling period information is set to 4, count information can be transmitted through the non-UE-specific A-MAP region in the superframe in which the superframe number modulo 4 is set to 0.

For example, if the ABI count scheduling period information is composed of 2 bits, 0b00 indicates '4', 0b01 indicates '8', 0b01 indicates '16', and 0b11 indicates '24'.

If the ABI count scheduling period information is set to 0b00, count information is contained in the extended non-UE-specific A-MAP region of all superframes in which the superframe number modulo 4 is set to 0.

If the ABI count scheduling period information is set to 0b01, count information is contained in the extended non-UE-specific A-MAP region of all superframes in which the superframe number modulo 8 is set to 0. If the ABI count scheduling period information is set to 0b10, count information is contained in the extended non-UE-specific A-MAP region of all superframes in which the superframe number modulo 16 is set to 0. If the ABI count scheduling period information is set to 0b11, count information is contained in the extended non-UE-specific A-MAP region of all superframes in which the superframe number modulo 24 is set to 0.

In this case, the extended non-UE-specific A-MAP region may be determined to be a region of a specific time. For example, the extended non-UE-specific A-MAP region may be fixed to a first non-UE-specific A-MAP region of the first frame contained in the corresponding superframe.

Through the ABI count scheduling period information, the UE can recognize which position is to be used for transmission of count information. Therefore, transmission information can be identified without addition of a separate type field.

Figure 10:
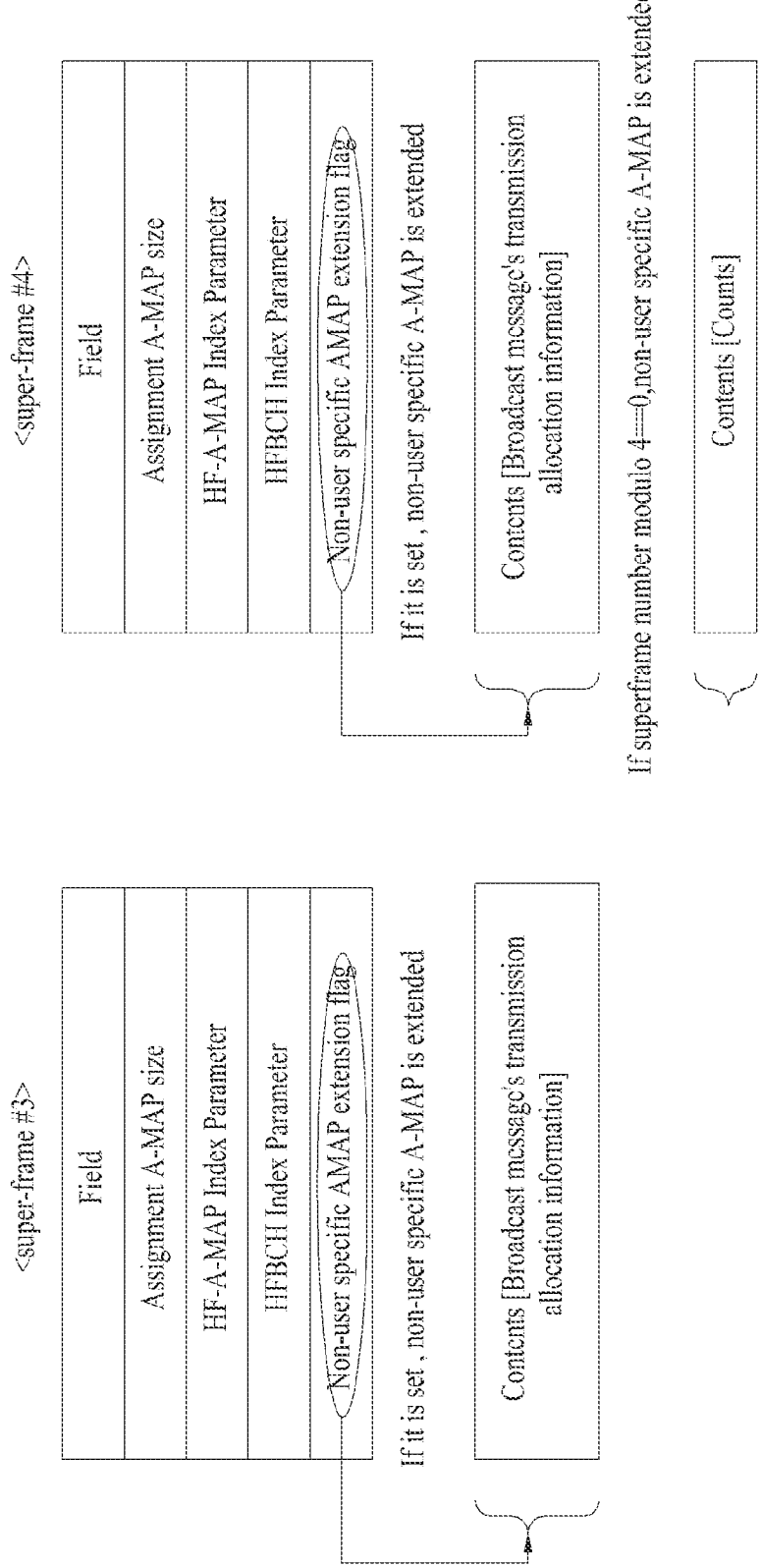
FIG. 10 shows an exemplary case in which count information is contained in a specific extended non-UE-specific A-MAP region at every superframe having a superframe number (modulo 4) of 0.

FIG. 10 shows an exemplary case in which count information is contained in a specific extended non-UE-specific A-MAP region at every superframe having a superframe number (modulo 4) of 0. Count information may be located just after the non-UE-specific A-MAP extended flag field, or may be transmitted just after transmission completion of allocation information of the additional broadcast message as shown in FIG. 10.

Figure 11:
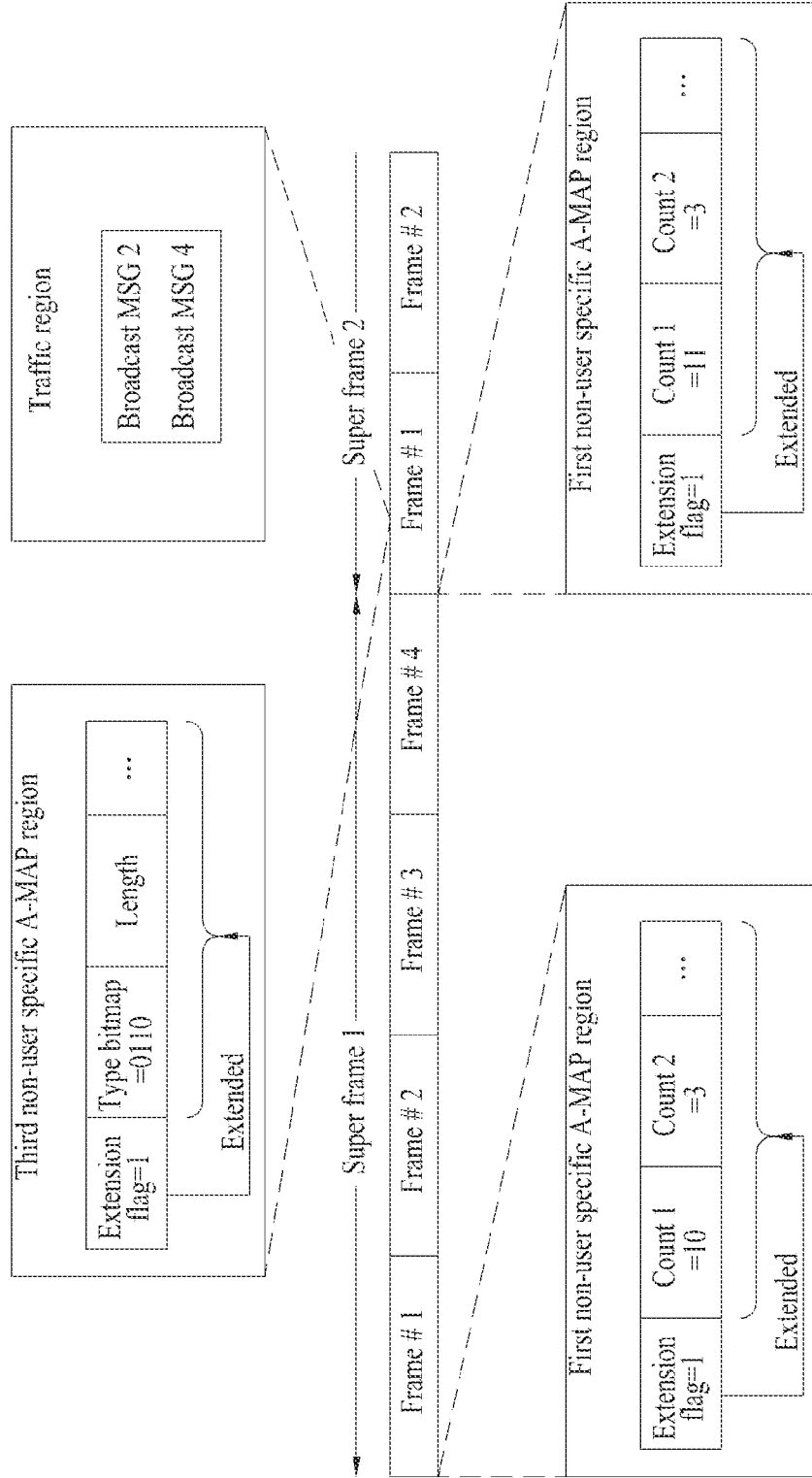
FIG. 11 shows an exemplary case in which count information is transmitted through a first extended non-UE-specific A-MAP region of a first frame of a superframe.

FIG. 11 shows an exemplary case in which count information is transmitted through a first extended non-UE-specific A-MAP region of a first frame for each superframe. Referring to FIG. 11, independent transmission of count information is achieved through the first extended non-UE-specific A-MAP region of the first frame of the superframe. Other control information may be transmitted through the remaining extended non-UE-specific A-MAP region.

In FIG. 11, the UE can recognize a difference between its own count1 value (10) and a count1 value (11) of the first non-UE-specific A-MAP region of the first frame of the second superframe. Therefore, the UE must update system information of the additional broadcast message corresponding to 'count1'. The UE decodes and updates the corresponding additional broadcast message at a transmission time of the corresponding additional broadcast message.

In addition, the idle-mode UE or the sleep-mode UE recognizes what time the count information is to be transmitted, such that information as to whether data is updated can be determined on the basis of count information transmitted at the corresponding time within the listening interval or the paging interval.

Figure 12:
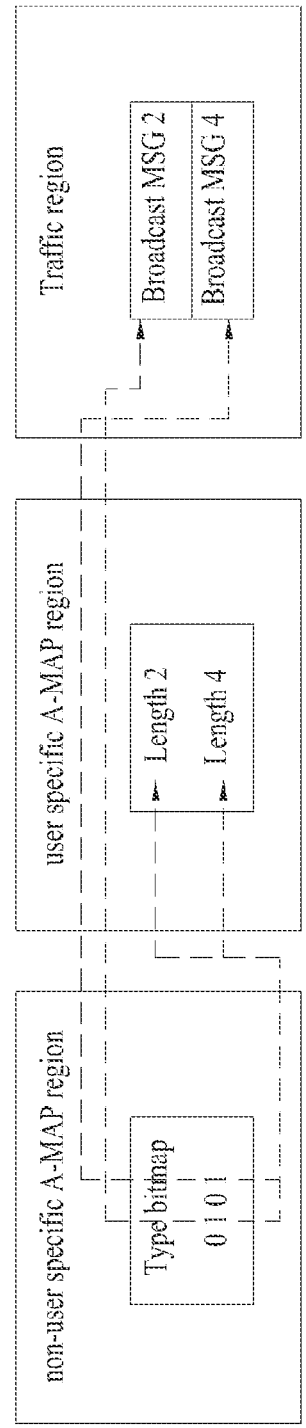
FIG. 12 shows an exemplary case in which control information of an additional broadcast message is transmitted through a non-UE-specific A-MAP region and a UE-specific A-MAP region.

Next, some parts of the control information of the additional broadcast message are transmitted through the non-UE-specific A-MAP region, the remaining parts are transmitted through the UE-specific A-MAP region, and a detailed description thereof will hereinafter be described with reference to FIG. 12. FIG. 12 shows an exemplary case in which control information of an additional broadcast message is transmitted through the non-UE-specific A-MAP region and the UE-specific A-MAP region.

In FIG. 12, the BS transmits the type bitmap through the non-UE-specific A-MAP region, and the remaining control information such as length, count, etc. is transmitted through the UE-specific A-MAP region.

In this case, the BS transmits the remaining information of the additional broadcast message, that has a bit value of 1 at the corresponding position of the type bitmap, to the UE-specific A-MAP region in the order of type bitmaps from the end point of the non-UE-specific A-MAP region.

The BS transmits the remaining information of the additional broadcast message, that has a bit value of 1 at the corresponding position of the type bitmap, to the UE specific A-MAP region in the order of type bitmaps from the end point of the non-UE-specific A-MAP region.

If the additional broadcast messages transmitted in the subframe corresponding to the A-MAP region is joint-coded, independent control information for each additional broadcast message need not be contained in the A-MAP region.

Figure 13:
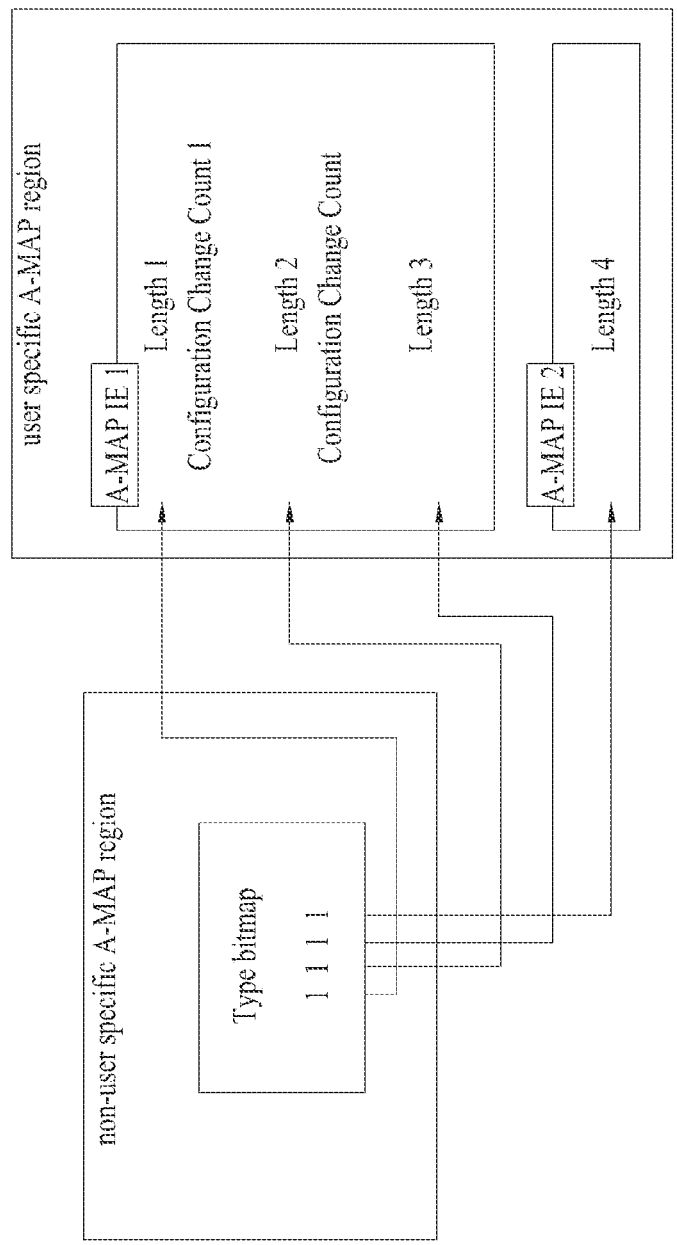
FIG. 13 shows a method for separating and transmitting control information of an additional broadcast message when control information of an additional broadcast message is not contained in one A-MAP IE.

FIG. 13 shows a method for separating and transmitting control information of an additional broadcast message when control information of an additional broadcast message is not contained in one A-MAP IE.

In FIG. 13, through the type bitmap value, the UE can implicitly recognize how many additional broadcast messages are to be used for A-MAP reception.

In addition, it can be recognized which one of additional broadcast messages is to be transmitted through the type bitmap value. Thus, if a bit corresponding to an additional broadcast message having count information such as the SCD or NBR-ADV message is set to 1, the UE can recognize that length and count information is contained in the A-MAP IE.

A method for transmitting control information of the additional broadcast message through the MAC message will hereinafter be described in detail.

Control information of the additional broadcast message transmitted through the MAC message includes type, ABI configuration change count, SCD count, and length. In addition, by means of the additional broadcast message (e.g., SCD message), the BS can indicate whether system information corresponding to the SCD configuration change count is currently applied through the SCD application offset, or can indicate when the system information is to be applied.

'Type' indicates the type of an additional broadcast message. If the type of the corresponding message can be implicitly recognized through the A-MAP sequence or the A-MAP type bitmap, the corresponding field may be omitted as necessary. The ABI configuration change count indicates version information of the corresponding additional broadcast message. The SCD count indicates version information of the additional broadcast message applied to the current system. 'Length' indicates the length of an additional broadcast message. If the additional broadcast message has a fixed length according to the type, 'Length' may be omitted as necessary.

A method for including control information regarding an additional broadcast message in the additional broadcast message will hereinafter be described in detail.

The additional broadcast message may include scheduling period information of the additional broadcast message of the additional broadcast message type including control information. For example, the SCD message may include scheduling period information of the SCD message.

Figure 14:
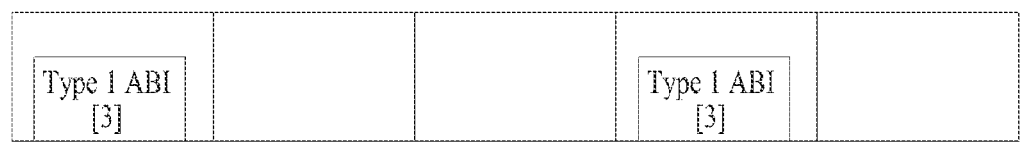
FIG. 14(a) shows an exemplary case in which an additional broadcast message includes a scheduling period.
FIG. 14(b) shows an exemplary case in which an additional broadcast message includes a scheduling offset.
Figure 14:
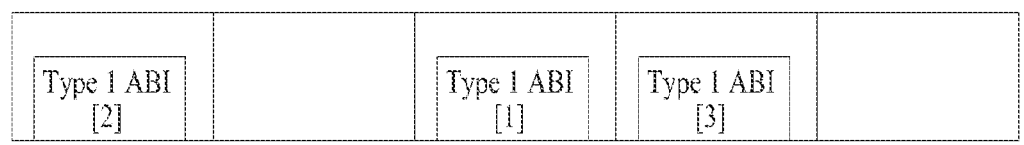

The scheduling period information may be a scheduling period or a scheduling offset. FIG. 14(a) shows an exemplary case in which an additional broadcast message includes a scheduling period, and FIG. 14(b) shows an exemplary case in which an additional broadcast message includes a scheduling offset.

Referring to FIG. 14(a), the Type 1 additional broadcast message is transmitted in the first superframe. In this case, the additional broadcast message includes a scheduling period of 3. Therefore, the Type 1 additional broadcast message is transmitted at intervals of three superframes.

In this case, the scheduling information may be achieved in units of a superframe or frame.

Referring to FIG. 14(b), the Type 1 additional broadcast message is transmitted in the first superframe. In this case, the additional broadcast message includes a scheduling offset of 2. Therefore, the Type 1 additional broadcast message is transmitted after lapse of two superframes. In this case, the Type 1 additional broadcast message includes a scheduling offset 1. Therefore, the Type 1 additional broadcast message is transmitted after lapse of one superframe.

In this case, the scheduling offset may be achieved in units of a superframe or frame.

In addition, each of specific-type additional broadcast messages may include the scheduling period, and other-type additional broadcast messages may include the scheduling offset. For example, MIMO-related additional broadcast messages and EMBS-related additional broadcast messages may be more frequently changed according to a situation, such that it is more preferable that each of the above-mentioned broadcast messages includes a scheduling offset.

The NBR-ADV message is a message for carrying system information of neighbor BSs, such that it may include information regarding the transmission position of the NBR-ADV messages of the neighbor BSs in the system information of the neighbor BSs. Tables 11 and 12 show the NBR-ADV message format.

TABLE 11

| field |
|---|
| ... |
| Number of BSs |
| For (i=0; i< Number of BSs ; i++) |
| { |
| BSID |
| Configuration Change Count |
| Some system parameters |
| Period for NBR-ADV |
| Offset for NBR-ADV |
| } |

TABLE 12

| field |
|---|
| ... |
| Number of BSs |
| For (i=0; i< Number of BSs ; i++) |
| { |
| BSID |
| Configuration Change Count |
| Some system parameters |
| } |
| For (i=0; i< Number of BSs ; i++) |
| { |
| Period for NBR-ADV |

TABLE 12-continued

Offset for NBR-ADV
}

Referring to Tables 11 and 12, the NBR-ADV message includes, in the order of BS identifications (BSIDs), information regarding the transmission position of the NBR-ADV messages of the neighbor BSs.

For example, provided that the number of neighbor BSs is set to 3 and BSIDs are sequentially transferred in the order of A→C→F, information regarding the NBR-ADV message transmission position of the BS 'A', information regarding the NBR-ADV message transmission position of the BS 'C', and information regarding the NBR-ADV message transmission position are sequentially transferred.

The additional broadcast message may include scheduling period information of the additional broadcast message other than the additional broadcast message type including control information.

First, the additional broadcast message may include scheduling periods of all other types. That is, the additional broadcast message includes periods of all additional broadcast messages different from the type of the currently-transmitted additional broadcast message.

Second, the additional broadcast message may include a scheduling period of the additional broadcast message corresponding to the type of the additional broadcast message to be transmitted subsequent to the corresponding additional broadcast message.

In this case, the additional broadcast message may include a scheduling period of the additional broadcast message corresponding to the type of the additional broadcast message to be transmitted subsequent to the corresponding additional broadcast message within either a specific S-SFH SP or another S-SFH SP period in which the start position is transmitted. In addition, if the corresponding broadcast message is determined to be the last additional broadcast message contained in the S-SFH SP period, the scheduling period field may be fixed to a predetermined value for indicating the last additional broadcast message.

Alternatively, the additional broadcast message may mandatorily include a scheduling period of the additional broadcast message corresponding to the type of the additional broadcast message to be transmitted just after the corresponding additional broadcast message, irrespective of the S-SFH SP period.

Third, the additional broadcast message may include all other types of scheduling offsets. That is, the additional broadcast message includes a scheduling offset of all additional broadcast message types different from the current additional broadcast message type.

Fourth, the additional broadcast message may include a scheduling offset of the additional broadcast message corresponding to the additional broadcast message type to be transmitted just after the corresponding additional broadcast message.

In this case, the additional broadcast message may include a scheduling period of the additional broadcast message corresponding to the type of the additional broadcast message to be transmitted subsequent to the corresponding additional broadcast message within either a specific S-SFH SP or another S-SFH SP period in which the start position is transmitted. In addition, if the corresponding broadcast message is determined to be the last additional broadcast message contained in the S-SFH SP period, the scheduling period field may be fixed to a predetermined value for indicating the last additional broadcast message.

Figure 15:
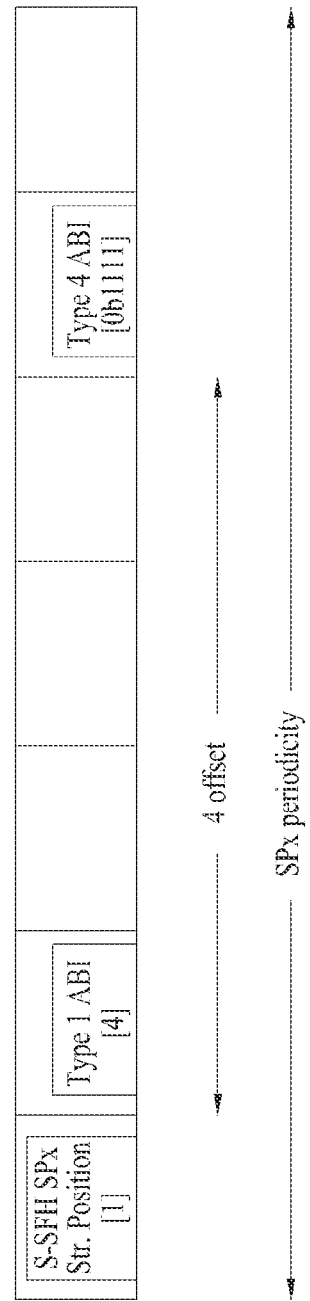
FIG. 15 shows an exemplary case in which an additional broadcast message includes a scheduling offset of an additional broadcast message corresponding to a type of an additional broadcast message to be transmitted subsequent to the corresponding additional broadcast message within an S-SFH SP period related to transmission of a start position.

FIG. 15 shows an exemplary case in which an additional broadcast message includes a scheduling offset of an additional broadcast message corresponding to a type of an additional broadcast message to be transmitted subsequent to the corresponding additional broadcast message within an S-SFH SP period related to transmission of a start position.

Referring to FIG. 15, a transmission interval of the S-SFH SPx includes 7 superframes. S-SFH SPx includes the start position of 1. Therefore, the Type 1 additional broadcast message is transmitted in the next superframe after transmission of the S-SFH SPx. The additional broadcast message includes a scheduling offset '4'. Therefore, the Type 4 additional broadcast message is transmitted after laps of four superframes. The additional broadcast message is the last additional broadcast message within the S-SFH SPx period, such that the scheduling offset field is set to 0b1111.

Alternatively, the additional broadcast message may mandatorily include a scheduling period of the additional broadcast message corresponding to the type of the additional broadcast message to be transmitted just after the corresponding additional broadcast message, irrespective of the S-SFH SP period.

After the UE continuously monitors the additional broadcast message or decodes the corresponding message at the predicted transmission position using scheduling period information of the recently received additional broadcast message, the UE compares its own corresponding message count with the received version. If the UE's message count is different from the received version, the UE updates system information contained in the corresponding message. Through the application count of the corresponding message, the UE can recognize the count of the current system information.

Next, a method for including control information regarding the additional broadcast message in the MAC management message associated with the network entry will hereinafter be described in detail.

First, a method for transmitting control information regarding the additional broadcast message during an initial network entry process will hereinafter be described in detail.

The UE includes the list of additional broadcast messages that have not yet received in the ranging request (AAI_RNG-REQ) message, and transmits the resultant AAI_RNG-REQ message. In this case, the list of additional broadcast messages may be represented by individual values of additional broadcast message types, or may also be represented in the form of bitmap. FIG. 16 shows that the list of additional broadcast messages is represented in the form of bitmap. The UE may exclude messages, such as the TRF-IND or PAG-ADV message unconcerned with an initial status, from the list of additional broadcast messages.

The BS having received the AAI_RNG-REQ message including the list of additional broadcast messages transmits control information of the additional broadcast messages present in the list of the received additional broadcast messages through the ranging response (AAI_RNG-RSP) message. Control information includes types and transmission positions of individual additional broadcast messages, etc. In this case, if control information is included in the AAI_RNG-RSP message in the order of the list of additional broadcast messages, the BS may omit the type field.

The UE having received the AAI_RNG-RSP message decodes and stores each additional broadcast message at transmission positions of the additional broadcast messages Next, a process for transmitting control information regarding the additional broadcast message during the network re-entry process will hereinafter be described in detail.

The UE transmits the AAI_RNG-REQ message including not only the list of either non-received additional broadcast messages or other additional broadcast messages whose version should be confirmed as the latest version, but also the configuration change count of additional broadcast messages. In this case, the list of additional broadcast messages may be represented in the form of values of individual additional broadcast message types or in the form of bitmap. In addition, the UE may exclude messages such as TRF-IND and PAG-ADV messages from the list of additional broadcast messages according to a UE status.

The BS having received the AAI_RNG-REQ message including the list of additional broadcast messages transmits control information of the additional broadcast messages present in the list of received additional broadcast messages through the ranging response (AAI_RNG-RSP) message.

Control information of the additional broadcast message including the configuration change count includes an update action code, a type, a transmission position (superframe number, frame number, sub-frame number), and a configuration change count. In this case, the type and the configuration change count may or may not be contained in the control information of the additional broadcast message.

The update action code '0b0' indicates that the latest version of the corresponding additional broadcast message is identical to a version transmitted from the UE. The update action code '0b1' indicates that the latest version of the corresponding additional broadcast message is different from a version transmitted from the UE such that updating of data is needed. The update action code '0b1' includes a type, a transmission position, and a configuration change count.

In this case, if control information is contained in the AAI_RNG-RSP message in the order of the list of additional broadcast messages, the BS may omit the type field as necessary.

Control information of the additional broadcast message including no configuration change count includes a type and a transmission position. In this case, if control information is contained in the AAI_RNG-RSP message in the order of the list of additional broadcast messages, the BS may omit the type field as necessary.

The BS includes the SCD count in the AAI_RNG-RSP message, and transmits the resultant AAI_RNG-RSP message.

The UE having received the AAI_RNG-RSP message decodes and stores each additional broadcast message at the transmission positions of the corresponding additional broadcast messages.

Next, a method for including control information regarding an additional broadcast message in a management message related to the idle mode switching will hereinafter be described in detail.

Table 13 shows action codes contained in the management message related to the idle mode switching.

TABLE 13

| Action code (hexadecimal) | Action |
| --- | --- |
| 00 | SS shall immediately terminate service with the BS and should attempt network entry at another BS. |
| 01 | SS shall listen to the current BS but shall not transmit until a RES-CMD message or DREG-CMD message with action code 02 or 03 is received. |

TABLE 13-continued

| Action code (hexadecimal) | Action |
| --- | --- |
| 02 | SS shall listen to the current BS but only transmit on the basic and primary management connections. |
| 03 | SS shall return to normal operation and may transmit on any of its active connections. |
| 04 | This option is valid only in response to a DREG-REQ message with De-Registration Request Code = 0x00. The SS shall terminate current Normal Operations with the BS. |
| 05 | MS shall immediately begin deregistration from serving BS and request initiation of MS idle mode. |
| 06 | This option is valid only in response to a DREG-REQ message with De-Registration Request Code = 0x01. The MS may retransmit the DREG-REQ massage after the time duration (REQduration) provided in the message; BS transmission of a subsequent. DREG-CMD message with Action Code 03 shall cancel this restriction. |
| 07-0xFF | Reserved |

First, a method for transmitting control information regarding an additional broadcast message when the UE starts switching to the idle mode will hereinafter be described in detail.

The UE transmits the deregistration request (AAI_DREG-REQ) message including not only the list of either non-received additional broadcast messages or other additional broadcast messages whose version should be confirmed as the latest version, but also the configuration change count of additional broadcast messages. In this case, the list of additional broadcast messages may be represented in the form of values of individual additional broadcast message types or in the form of bitmap. In addition, the UE may exclude messages such as TRF-IND and PAG-ADV messages from the list of additional broadcast messages according to a UE status.

The BS having received the AAI_RNG-REQ message including the list of additional broadcast messages determines whether to include, according to the action code value, control information of the additional broadcast messages present in the list of received additional broadcast messages in the deregistration command (AAI_DREG-CMD) message.

If the action code contained in the AAI_DREG-CMD message commands deregistration or normal operation completion, control information of the additional broadcast message is contained in the AAI_DREG-CMD message such that the resultant AAI_DREG-CMD message is transmitted.

Control information regarding the additional broadcast message including the configuration change count includes an update action code, a type, a transmission position (superframe number, frame number, sub-frame number), and a configuration change count. In this case, the type and the configuration change count may or may not be contained in the control information of the additional broadcast message.

The update action code '0b0' indicates that the latest version of the corresponding additional broadcast message is identical to a version transmitted from the UE. The update action code '0b1' indicates that the latest version of the corresponding additional broadcast message is different from a version transmitted from the UE such that updating of data is needed. The update action code '0b1' includes a type, a transmission position, and a configuration change count.

Control information of the additional broadcast message including no configuration change count includes a type and a transmission position. In this case, if control information is contained in the AAI_DREG-CMD message in the order of the list of additional broadcast messages, the BS may omit the type field as necessary.

The BS includes the SCD count in the AAI_RNG-RSP message, and transmits the resultant AAI_RNG-RSP message.

If the action code contained in the AAI_DREG-CMD message commands deregistration or normal operation completion, the UE is woken up at the transmission position of the corresponding additional broadcast messages, and decodes and stores each additional broadcast message.

Next, a method for transmitting control information regarding an additional broadcast message when the UE starts switching to the idle mode will hereinafter be described in detail.

The BS determines whether to include control information of all or some additional broadcast messages in the AAI_DREG-CMD message according to the action code value.

If the action code contained in the AAI_DREG-CMD message commands deregistration or normal operation completion, control information of the additional broadcast message is contained in the AAI_DREG-CMD message such that the resultant AAI_DREG-CMD message is transmitted.

Control information regarding the additional broadcast message including the configuration change count includes a type, a transmission position (superframe number, frame number, sub-frame number), and a configuration change count.

Control information of the additional broadcast message including no configuration change count includes a type and a transmission position. In this case, if control information is contained in the AAI_DREG-CMD message in the order of the list of additional broadcast messages, the BS may omit the type field as necessary.

The BS includes the SCD count in the AAI_RNG-RSP message, and transmits the resultant AAI_RNG-RSP message.

If the action code commands deregistration or normal operation completion, the UE having received the AAI_DREG-CMD message from the BS is woken up at the transmission position of the corresponding additional broadcast messages, and can decode and store each additional broadcast message. In this case, the UE can decide whether to decode data by comparing current and legacy configuration change counts of individual messages with each other.

Next, a method for including control information regarding the additional broadcast message in the AAI_PAG-ADV message or paging identification information (PGID) message will hereinafter be described in detail.

The BS includes control information of all or some additional broadcast messages in the AAI_PAG-ADV message or the PGID message, and transmits the resultant AAI_PAG-ADV or PGID message.

Control information of the additional broadcast message including the configuration change count includes a type, a transmission position (superframe number, frame number, sub-frame number), and a configuration change count.

Control information of the additional broadcast message including no configuration change count includes a type and a transmission position. In this case, if control information is contained in the AAI_PAG-ADV or PGID message in the predetermined order, the BS may omit the type field as necessary.

The BS includes the SCD count in the AAI_RNG-RSP message, and transmits the resultant AAI_RNG-RSP message.

The UE having received the AAI_PAG-ADV or PGID message is woken up at the transmission position of the corresponding additional broadcast messages, and decodes and stores each additional broadcast message. In this case, the UE can decide whether to decode data by comparing current and legacy configuration change counts of individual messages with each other.

A method for including control information regarding the additional broadcast message in the management message related to the sleep mode switching will hereinafter be described in detail.

First, a method for transmitting control information regarding the additional broadcast message when the UE starts switching to the sleep mode will hereinafter be described in detail.

The UE transmits the sleep request (AAI_SLEP-REQ) message including not only the list of either non-received additional broadcast messages or other additional broadcast messages whose version should be confirmed as the latest version, but also the configuration change count of additional broadcast messages. In this case, the list of additional broadcast messages may be represented in the form of values of individual additional broadcast message types or in the form of bitmap. In addition, the UE may exclude messages such as TRF-IND and PAG-ADV messages from the list of additional broadcast messages according to a UE status.

The UE having received the AAI_SLP-REQ message including the list of additional broadcast messages determines whether to include control information of additional broadcast messages present in the list of received additional broadcast messages in the sleep response (AAI_SLP-RSP) message according to the sleep approved (Sleep_Approved) value.

If sleep allowance contained in the AAI_SLP-RSP message indicates allowance, control information of the additional broadcast message is included in the AAI_SLP-RSP message, and the resultant AAI_SLP-RSP message is transmitted.

Control information of the additional broadcast message including the configuration change count includes an update action code, a type, a transmission position (superframe number, frame number, sub-frame number), and a configuration change count. In this case, the type and the configuration change count may or may not be contained in the control information of the additional broadcast message.

The update action code '0b0' indicates that the latest version of the corresponding additional broadcast message is identical to a version transmitted from the UE. The update action code '0b1' indicates that the latest version of the corresponding additional broadcast message is different from a version transmitted from the UE such that updating of data is needed. The update action code '0b1' includes a type, a transmission position, and a configuration change count.

Control information of the additional broadcast message including no configuration change count includes a type and a transmission position. In this case, if control information is contained in the AAI_SLP-RSP message in the order of the list of additional broadcast messages, the BS may omit the type field as necessary.

The BS includes the SCD count in the AAI_RNG-RSP message, and transmits the resultant AAI_RNG-RSP message.

If the Sleep_Approved value indicates allowance, the UE having received the AAI_SLP-RSP message is woken up at the transmission position of the corresponding additional broadcast messages, and decodes and stores each additional broadcast message.

Next, a method for transmitting control information regarding the additional broadcast message when the UE starts switching to the sleep mode will hereinafter be described in detail.

The BS includes control information of all or some additional broadcast messages in the AAI_SLP-RSP message, and transmits the resultant AAI_SLP-RSP message.

Control information of the additional broadcast message including the configuration change count includes a type, a transmission position (superframe number, frame number, sub-frame number), and a configuration change count.

Control information of the additional broadcast message including no configuration change count includes a type and a transmission position. In this case, if control information is contained in the AAI_SLP-RSP message in the predetermined order, the BS may omit the type field as necessary.

The BS includes the SCD count in the AAI_SLP-RSP message, and transmits the resultant AAI_SLP-RSP message.

The UE having received the AAI_SLP-RSP message is woken up at the transmission position of the corresponding additional broadcast messages, and decodes and stores each additional broadcast message. In this case, the UE can decide whether to decode data by comparing current and legacy configuration change counts of individual messages with each other.

Next, a method for including control information regarding the additional broadcast message in the AAI_TRF-IND message will hereinafter be described in detail.

The BS includes control information of all or some additional broadcast messages in the AAI_TRF-IND message, and transmits the resultant AAI_TRF-IND message.

Control information of the additional broadcast message including the configuration change count includes a type, a transmission position (superframe number, frame number, sub-frame number), and a configuration change count.

Control information of the additional broadcast message including no configuration change count includes a type and a transmission position. In this case, if control information is contained in the AAI_TRF-IND message in the predetermined order, the BS may omit the type field as necessary.

The BS includes the SCD count in the AAI_TRF-IND message, and transmits the resultant AAI_TRF-IND message.

The UE having received the AAI_TRF-IND message is woken up at the transmission position of the corresponding additional broadcast messages, and decoded and stores each additional broadcast message. In this case, the UE can decide whether to decode data by comparing current and legacy configuration change counts of individual messages with each other.

Figure 17:
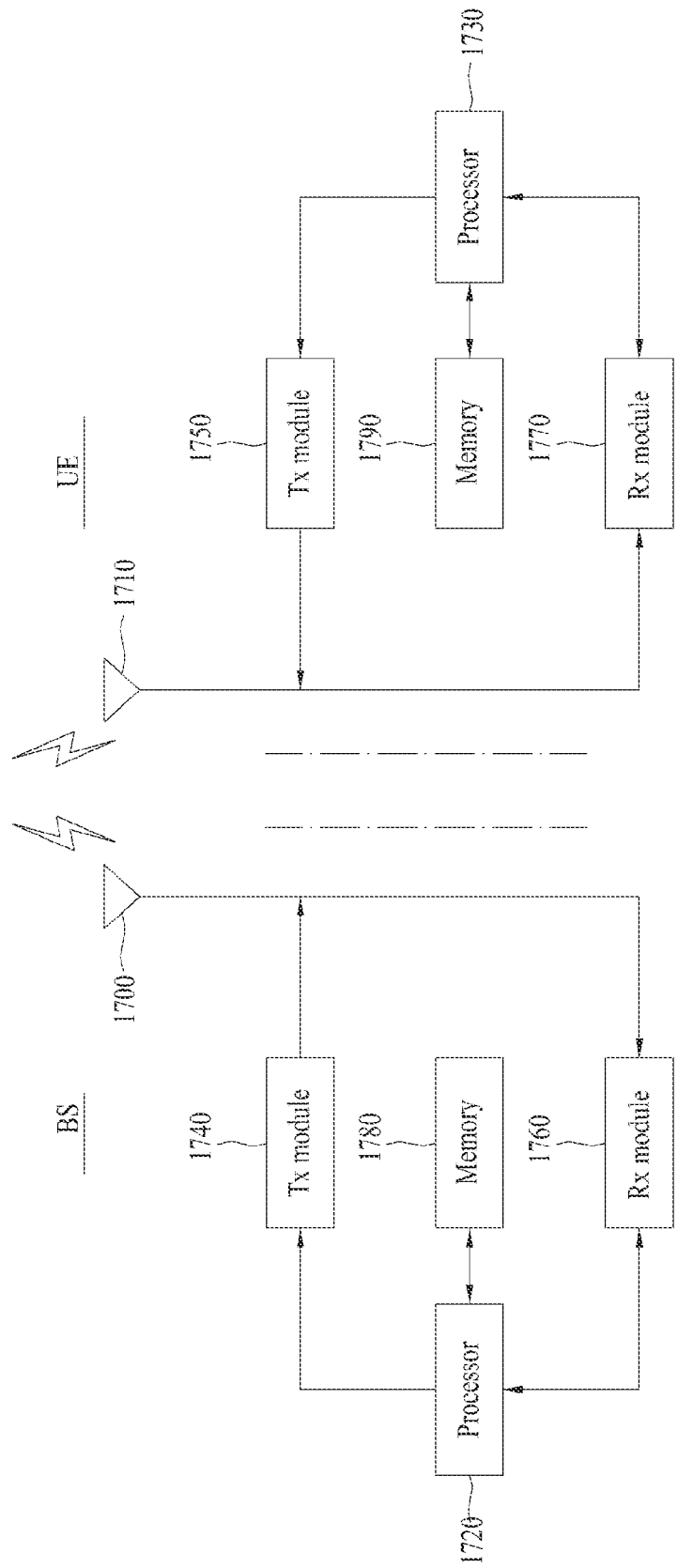
FIG. 17 is a block diagram illustrating a user equipment (UE) and a base station (BS) applicable to embodiments of the present invention.

FIG. 17 is a block diagram illustrating detailed constituent components of a user equipment (UE) and a base station (BS) that can be implemented through the above-mentioned embodiments.

Referring to FIG. 17, each of the UE (also called 'AMS') and the BS (also called 'ABS') may include an antenna 1700 or 1710 for transmitting and receiving information, data, signals and/or messages, a Transmission (Tx) module 1740 or 1750 for transmitting messages by controlling the antenna 1700 or 1710, a Reception (Rx) module 1760 or 1770 for receiving messages by controlling the antenna 1700 or 1710, a memory 1780 or 1790 for storing information related to BS communication, and a processor 1720 or 1730 for controlling the memory 1780 or 1790. In this case, the BS may be a femto BS (FBS) or a macro BS (MBS). The components of the UE are the counter parts of those of the BS. The components of the transmitter and the receiver will be described below in more detail.

The antennas 1700 and 1710 include Tx antennas for transmitting signals generated from Tx modules 1740 and 1750 and Rx antennas for receiving radio frequency (RF) signals and providing the received RF signals to the Rx modules 1760 and 1770. If Multiple Input Multiple Output (MIMO) is supported, two or more antennas may be provided.

The processors 1720 and 1730 generally provide overall control to the UE and the BS, respectively. Especially, the processors 1720 and 1730 may perform a control function for implementing the above-described exemplary embodiments of the present invention, a variable MAC frame control function based on service characteristics and a propagation environment, a handover function, an authentication and encryption function, etc. In addition, each of the processors 1720 and 1730 may include an encryption module for controlling encryption of various messages and a timer module for controlling transmission and reception of various messages.

The processor 1720 of the BS generates control information including information of a transmission time point of the additional broadcast message. In this case, control information regarding the additional broadcast message may further include a configuration change count indicating version information of the additional broadcast message.

If the configuration change count received from the BS is different from the configuration change count stored in the UE, the processor 1730 of the UE receives and updates the additional broadcast message at a transmission time point of the additional broadcast message.

The Tx modules 1740 and 1750 may encode and modulate transmission data scheduled by the processors 1720 and 1730 according to a predetermined coding and modulation scheme and provide the modulated data to the antennas 1700 and 1710.

The Tx module 1740 of the BS transmits control information of the additional broadcast message, and transmits the additional broadcast message over a traffic channel at the transmission time point of the additional broadcast message 1740.

The Rx modules 1760 and 1770 may recover original data by demodulating and decoding data received through the antennas 1700 and 1710 and provide the recovered data to the processors 1720 and 1730.

The Rx module 1770 of the UE receives control information, that includes not only information of a transmission time point of the additional broadcast message but also a configuration change count indicating version information of the additional broadcast message, from the BS, and receives the additional broadcast message at the transmission time point.

The memories 880 and 890 may store programs for processing and control of the processors 820 and 830 and temporarily store input/output data (on the side of the UE, an uplink grant received from the BS, system information, a station identifier (STID), a flow identifier (FID), an action time, area assignment information, frame offset information and the like).

Each of the memories 1780 and 1790 may include at least one type of storage media such as a flash memory, a hard disk, a multimedia card micro memory, a card-type memory (e.g. a Secure Digital (SD) or eXtreme Digital (XD) memory), a Random Access Memory (RAM), a Static Random Access Memory (SRAM), a Read-Only Memory (ROM), an Electrically Erasable Programmable Read-Only Memory (EEPROM), a Programmable Read-Only Memory, a magnetic memory, a magnetic disc, an optical disc, etc.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other.

Accordingly, the invention should not be limited to the specific embodiments described herein, but should be accorded the broadest scope consistent with the principles and novel features disclosed herein.

The invention claimed is:

1. A method for receiving control information for an additional broadcast message by a user equipment (UE) of a wireless communication system, the method comprising:
   receiving, by the UE from a base station (BS), control information, the control information including a system configuration descriptor (SCD) count indicating version information of a system configuration to be applied for the UE; and
   receiving, by the UE from the BS, the additional broadcast message, the additional broadcast message including a system configuration information and a configuration change count indicating version information of the system configuration information,
   wherein the additional broadcast message is an Advanced Air Interface System Configuration Descriptor (AAI_SCD) message,
   wherein the SCD count included in the received control information is the same as the configuration change count included in the received additional broadcast message,
   wherein the BS applies the system configuration information included in the additional broadcast message,
   wherein, if the SCD count included in the received control information is different from a previous SCD count saved lastly at the UE and if the SCD count has not been applied yet in the UE, the UE applies a system configuration information associated with the previous SCD count saved lastly at the UE, and
   wherein, if the SCD count included in the received control information is different from the previous SCD count saved lastly at the UE and if the SCD count has been applied in the UE, the UE applies the system configuration information included in the received additional broadcast message.

2. The method according to claim 1, wherein the control information is received through a secondary superframe header (S-SFH).

3. The method according to claim 1, wherein the control information further includes a minimum duration of the control information.

4. The method according to claim 3, wherein the received additional broadcast message is updated when the minimum duration of the control information is over.

5. The method according to claim 3, wherein the minimum duration of the control information is represented in a unit of superframe.

6. The method according to claim 1, wherein the additional broadcast message is received at a periodic interval.

7. The method according to claim 1, wherein the control information further includes information of a transmission time point of the additional broadcast message, and the additional broadcast message is received at the transmission time point.

8. A method for transmitting control information for an additional broadcast message by a base station (BS) of a wireless communication system, the method comprising:
   transmitting, by the BS to a user equipment (UE), control information, the control information including a system configuration descriptor (SCD) count indicating version information of a system configuration to be applied for the UE; and
   transmitting, by the BS to the UE, the additional broadcast message, the additional broadcast message including a system configuration information and a configuration change count indicating version information of the system configuration information,
   wherein the additional broadcast message is an Advanced Air Interface System Configuration Descriptor (AAI_SCD) message,
   wherein the SCD count included in the transmitted control information is the same as the configuration change count included in the transmitted additional broadcast message,
   wherein the BS applies the system configuration information included in the additional broadcast message,
   wherein, if the SCD count included in the transmitted control information is different from a previous SCD count saved lastly at the UE and if the SCD count has not been applied yet in the UE, the UE applies a system configuration information associated with the previous SCD count saved lastly at the UE, and
   wherein, if the SCD count included in the transmitted control information is different from the previous SCD count saved lastly at the UE and if the SCD count has been applied in the UE, the UE applies the system configuration information included in the transmitted additional broadcast message.

9. The method according to claim 8, wherein the control information is transmitted through a secondary superframe header (S-SFH).

10. The method according to claim 8, wherein the control information further includes a minimum duration of the control information.

11. The method according to claim 10, wherein the minimum duration of the control information is represented in a unit of superframe.

12. The method according to claim 8, wherein the additional broadcast message is transmitted at a periodic interval.

13. The method according to claim 8, wherein the control information further includes information of a transmission time point of the additional broadcast message, and the additional broadcast message is transmitted at the transmission time point.

14. A user equipment of a wireless communication system for receiving control information for an additional broadcast message, the user equipment comprising:
   a receiver; and
   a processor operatively connected to the receiver and configured to:
      receive, from a base station (BS), control information, the control information including a system configuration descriptor (SCD) count indicating version information of a system configuration to be applied for the user equipment; and
      receive, from the BS, the additional broadcast message, the additional broadcast message including a system configuration information and a configuration change count indicating version information of the system configuration information,
      wherein the additional broadcast message is an Advanced Air Interface System Configuration Descriptor (AAI_SCD) message, wherein the SCD count included in the received control information is the same as the configuration change count included in the received additional broadcast message, wherein the BS applies the system configuration information included in the additional broadcast message, wherein, if the SCD count included in the received control information is different from a previous SCD count saved lastly at the user equipment and if the SCD count has not been applied yet in the user equipment, the user equipment applies a system configuration information associated with the previous SCD count saved lastly at the user equipment, and wherein, if the SCD count included in the received control information is different from the previous SCD count saved lastly at the user equipment and if the SCD count has been applied in the user equipment, the user equipment applies the system configuration information included in the received additional broadcast message.

15. The user equipment according to claim 14, wherein the control information is received through a secondary superframe header (S-SFH).

16. The user equipment according to claim 14, wherein the control information further includes a minimum duration of the control information, and the processor updates the received additional broadcast message when the minimum duration of control information is over.

17. A base station of a wireless communication system for transmitting control information for an additional broadcast message, the base station comprising:

a transmitter; and a processor operatively connected to the transmitter and configured to:

transmit, to a user equipment (UE), control information, the control information including a system configuration descriptor (SCD) count indicating version information of a system configuration to be applied for the UE; and transmit, to the UE, the additional broadcast message, the additional broadcast message including a system configuration information and a configuration change count indicating version information of the system configuration information, wherein the additional broadcast message is an Advanced Air Interface System Configuration Descriptor (AAI_SCD) message, wherein the SCD count included in the transmitted control information is the same as the configuration change count included in the transmitted additional broadcast message, wherein the base station applies the system configuration information included in the additional broadcast message, wherein, if the SCD count included in the transmitted control information is different from a previous SCD count saved lastly at the UE and if the SCD count has not been applied yet in the UE, the UE applies a system configuration information associated with the previous SCD count saved lastly at the UE, and wherein, if the SCD count included in the transmitted control information is different from the previous SCD count saved lastly at the UE and if the SCD count has been applied in the UE, the UE applies the system configuration information included in the transmitted additional broadcast message.

18. The base station according to claim 17, wherein the control information is transmitted through a secondary superframe header (S-SFH).

19. The base station according to claim 17, wherein the control information further includes a minimum duration of the control information.

20. The method according to claim 1, further comprising:

determining if the SCD count included in the received control information is different from the previous SCD count saved lastly at the UE and if the SCD count has not been applied yet in the UE.

21. The user equipment according to claim 8, wherein the processor is configured to determine if the SCD count included in the received control information is different from the previous SCD count saved lastly at the user equipment and if the SCD count has not been applied yet in the user equipment.

* * * * *